(12) United States Patent
Abe et al.

(10) Patent No.: US 7,421,190 B2
(45) Date of Patent: Sep. 2, 2008

(54) VIDEO TAPE RECORDER AND RECORDING METHOD

(75) Inventors: Fumiyoshi Abe, Kanagawa (JP); Takuji Himeno, Chiba (JP); Toshinori Kouzai, Kanagawa (JP); Yonetaro Totsuka, Tokyo (JP)

(73) Assignee: Sony Corporation, Tokyo (JP)

( * ) Notice: Subject to any disclaimer, the term of this patent is extended or adjusted under 35 U.S.C. 154(b) by 677 days.

(21) Appl. No.: 10/516,677

(22) PCT Filed: May 16, 2003

(86) PCT No.: PCT/JP03/06103

§ 371 (c)(1),
(2), (4) Date: Dec. 3, 2004

(87) PCT Pub. No.: WO03/105472

PCT Pub. Date: Dec. 18, 2003

(65) Prior Publication Data

US 2005/0238330 A1    Oct. 27, 2005

(30) Foreign Application Priority Data

Jun. 6, 2002    (JP) .............................. 2002-165500

(51) Int. Cl.
*H04N 5/91* (2006.01)

(52) U.S. Cl. ........................................ 386/95; 386/111
(58) Field of Classification Search .................. 386/95, 386/96, 98, 111
See application file for complete search history.

(56) References Cited

U.S. PATENT DOCUMENTS

2002/0003947 A1 *    1/2002    Abe et al. ...................... 386/96

FOREIGN PATENT DOCUMENTS

| JP | 9-70016 | 3/1997 |
|---|---|---|
| JP | 2001-275077 | 10/2001 |
| JP | 2001-291335 | 10/2001 |

\* cited by examiner

*Primary Examiner*—Thai Tran
*Assistant Examiner*—Hung Q Dang
(74) *Attorney, Agent, or Firm*—Frommer Lawrence & Haug LLP; William S. Frommer

(57) ABSTRACT

The present invention is particularly applied to a video tape recorder for recording a video signal of an HDTV (high-definition television) on a magnetic tape. In the video tape recorder, the recording position of the head of each pack unit is set so as to have a predetermined relationship with the recording position determined by the corresponding time management information.

9 Claims, 30 Drawing Sheets

| RUN PATTERN | CODE WORD MSB                          LSB |
|---|---|
| RUN PATTERN A | 0 0 0 1 1 1 0 0 0 1 1 1 0 0 0 0 0 1 1 1 0 0 0 1 1 |
| RUN PATTERN B | 1 1 1 0 0 0 1 1 1 0 0 0 1 1 1 1 1 0 0 0 1 1 1 0 0 | x25/24 = 130425 BITS

FIG. 5

|  | MSB | LSB |
|---|---|---|
| SINK PATTERN M0 | 0 1 0 1 1 1 1 1 1 1 1 1 0 0 0 0 | |
| SINK PATTERN M1 | 1 0 1 0 0 0 0 0 0 0 0 0 1 1 1 1 | |

FIG. 6

| ID0 | | ID1 | ID2 |
|---|---|---|---|
| b7-5 | b4 - 0 | MSB | MSB |
| FORMAT TYPE | TRACK PAIR NUMBER (0 TO 31) | SINK BLOCK NUMBER | OVERWRITE PROTECT |

FIG. 7

| b7 | b6 | b5 | b4 | b3 | b2 | b1 | b0 |
|---|---|---|---|---|---|---|---|
| ← DATA TYPE → | | | | | | | |
| 0 | NULL | | | | | | |
| 1 | AUX | | | RESERVED | | | |
| 2 | PES-VIDEO | | FULL/PARTIAL | AUX MODE | | DF/FRC | SBSC |
| 3 | PES-VIDEO | | FULL/PARTIAL | CONTINUITY COUNTER | | | |
| 4 | TS-1H | | JUMP FLAG | CONTINUITY COUNTER | | | |
| 5 | TS-2H | | TIME STAMP | | | | |
| 6 | SEARCH | | RESERVED | SEARCH SPEED | | | SBSC |
| 7 | RESERVED | | RESERVED | | | | |

| AUX MODE | b4-2 | b1 |
|---|---|---|
| 0 | AUX-V | FRC |
| 1 | AUX-A | RESERVED |
| 2 | PES-PSI 1 | RESERVED |
| 3 | PES-PSI 2 | RESERVED |
| 4 | AUX-SYSTEM (ECCTB) | DF |
| 5 | AUX-M | FRC |
| 6,7 | RESERVED | RESERVED |

| SEARCH SPEED | |
|---|---|
| 0 | RESERVED |
| 1 | RESERVED |
| 2 | SEARCH x8 |
| 3 | RESERVED |
| 4 | SEARCH x24 |
| 5-7 | RESERVED |

FIG. 8

| SINK | ID | SB HEADER | MAIN (BEFORE 24-TO-25 MODULATION) | | | | C1 | (Kbps) | (NUMBER OF SB) | (%) |
|---|---|---|---|---|---|---|---|---|---|---|
| | | | AUX | | | | | 501 | 2.2 | 1.6% |
| | | | VIDEO DATA | | | | | 25,021 | 109.9 | 77.9% |
| | | | | AUDIO DATA | | | 9.0% | 421 | 1.85 | 1.3% |
| | | | | | SEARCH DATA | | | 2,073 | 9.1 | 6.5% |
| | | | | | | C2 | | | 18 | 12.8% |
| 2 BYTES | 3 BYTES | 1 BYTE | 95 BYTES | | | | 10 BYTES | | 141 | 100.0% |

FIG. 12

FOUR-BYTE FIXED LENGTH

| KEY-WORD | AUX TYPE | CONTENT | REMARKS |
|---|---|---|---|
| 0 | SUB | TTC | FOR 1 PACKET OF 5 BYTES IN SUB-CODE |
| 1 | SUB | BINARY GROUP | |
| 2 | SUB | PART NUMBER | |
| 3 | SUB | CHAPTER START | |
| 4 | SUB | ATNF (ATN+FLG) | |
| 5 | SUB | RECORDING DATE | |
| 6 | SUB | RECORDING TIME | |
| 7 | SUB | ETN | |
| 8 | RES. | RESERVED | |
| : | RES. | RESERVED | |
| 62 | RES. | RESERVED | |
| 63 | RES. | NO-INFORMATION PACK | USED WHEN NO VALID DATA |

FIG. 13

VARIABLE-DATA-LENGTH PACKET

| KEY-WORD | AUX TYPE | CONTENT | REMARKS |
|---|---|---|---|
| 64 | AUX-A | AUD-FRAM | PES-AUD & EDIT INFO. |
| 65 | AUX-A | RESERVED | |
| 66 | AUX-A | RESERVED | |
| 67 | AUX-A | RESERVED | |
| 68 | AUX-V | VID-FRAM | PES-VIDEO & EDIT INFO. |
| 69 | AUX-V | RESERVED | |
| 70 | AUX-V | RESERVED | |
| 71 | AUX-V | RESERVED | |
| 72 | AUX-V | UMID | 64-BYTE DATA |
| 73 | AUX-V | DV PACKET | COMPATIBLE-WITH-DV 5-BYTE PACKET MAXIMUM OF 18 |
| 74 | AUX-V | RESERVED | |
| 75 | AUX-V | RESERVED | |
| 76 | AUX-V | RESERVED | |
| 77 | AUX-V | ASCII CHARACTER MESSAGE | |
| 78 | AUX-V | SHIFT JIS MESSAGE | JAPANESE TEXT |
| 79 | AUX-V | BINARY | |
| 80 | SYSTEM | ECCTB | EDIT INFO/SUB-CODE DATA |
| 81 | SYSTEM | RESERVED | |
| 82 | SYSTEM | RESERVED | |
| 83 | SYSTEM | RESERVED | |
| 84 | RESERVED | RESERVED | |
| : | RESERVED | RESERVED | |
| 119 | RESERVED | RESERVED | |
| 120 | AUX-M | RESERVED | |
| 121 | AUX-M | | |
| 122 | AUX-M | | |
| 123 | AUX-M | | |
| : | AUX-M | | |
| 126 | AUX-M | | |
| 127 | AUX-N | NULL | NULL PACKET |

FIG. 14

| DATA # | CONTENT | NUMBER OF BYTES | REMARKS |
|---|---|---|---|
| 0. | AUDIO FRAME KEYWORD PACKET | 1 | KEYWORD = 64 |
| 1. | LENGTH | 1 | 92 |
| 2. | VTR MODE | 1 | OPERATION MODE FOR TS OUTPUT |
| 3. | ATNF (FLE+ATN+FLG) | 5 | SAME CONTENT AS COMBINED VID-FRAME |
| 8. | EXTENDED TRACK NUMBER | 3 | SAME CONTENT AS COMBINED VID-FRAME |
| 11. | TTC | 5 | SAME CONTENT AS COMBINED VID-FRAME |
| 16. | | | |
| 16. | DATE/TIME ORIGINAL | 10 | IN THE ORDER OF DATE(5B) + TIME(5B) KW 1B+ |
| 26. | DATE/TIME MAIN | 8 | IN THE ORDER OF DATE(4B) + TIME(4B) |
| 34. | GENERATION NUMBER | 1 | INCLUDING COPYRIGHT 2 BITS |
| 35. | | | |
| 35. | STATUS INFORMATION 1 (WITH HISTORY) | 1 | CONNECTING POINT INCLUDING EDITING: 0, 1 TO 7f COUNT UP |
| 36. | STATUS INFORMATION 2 (WITHOUT HISTORY) | 1 | STARTING POINT OF RECORDING DURING EDITING: 0, 1 TO 7f COUNT UP |
| 37. | AUDIO MODE | | 10 (TOTAL OF BYTES) |
| 37. | AUDIO FRAME SIZE | 2 | NUMBER OF SAMPLES OF AAU (MEANINGFUL ONLY IN LPCM) |
| 39. | SAMPLING FREQUENCY | 0.375 | |
| 39. | QUANTIZATION | 0.625 | (5 BITS) VALUE = 0 TO 31 BITS |
| 40. | AUDIO CHANNEL MODE | 0.5 | |
| 40. | AUDIO COMPRESSION MODE | 0.5 | |
| 41. | BIT-RATE INDEX | 0.5 | |
| 41. | RESERVED | 0.5 | |
| 42. | AUDIO SOURCE CONTROL | 1 | APPROXIMATELY THE SAME MEANING AS DV |
| 43. | | | |
| 43. | RESERVED | 4 | |
| 47. | DECODING REFERENCE INFORMATION | | 11 (TOTAL OF BYTES) |
| 47. | AUDIO FRAME NUMBER (FIRST) | 3 | INTEGRATED VALUE OF GOAF |
| 50. | NUMBER OF AUDIO FRAMES | 1 | GOAF: NUMBER OF AAUS CONTINUOUSLY RECORDED |
| 51. | PTS | 5 | |
| 56. | AUDIO PTS COMPENSATION | 2 | |
| 58. | | | |
| 58. | RESERVED (AUD-FRAME) | 3 | |
| 94. | | | |
| | TOTAL | 94 | |

FIG. 15

| DATA # | CONTENT | NUMBER OF BYTES | REMARKS |
|---|---|---|---|
| 0.0 | VIDEO FRAME KEYWORD PACKET | 1 | KEYWORD = 68 |
| 1.0 | LENGTH | 1 | 92 |
| 2.0 | VTR MODE | 1 | OPERATION MODE FOR TS OUTPUT |
| 3.0 | ATNF (FLE+ATN+FLG) | 5 | INFORMATION CONCERNING ETN (EFN) POSITION CORRESPONDING TO DTS TIME |
| 8.0 | ETN 8 (EXTENDED TRACK NUMBER) | 3 | EFN CORRESPONDING TO TTC AT DTS TIME |
| 11.0 | TTC | 5 | TTC AT DTS TIME |
| 16.0 | BINARY GROUP | 5 | FOR CORRESPONDING FRAME WHEN TTC IS TC |
| 21.0 | | | |
| 21.0 | DATE/TIME ORIGINAL | 10 | IN THE ORDER OF DATE(5B) + TIME(5B) KW 1B |
| 31.0 | DATE/TIME MAIN | 8 | IN THE ORDER OF DATE(4B) + TIME(4B) |
| 39.0 | GENERATION NUMBER | 1 | INCLUDING COPYRIGHT 2 BITS |
| 40.0 | | | |
| 40.0 | STATUS INFORMATION 1 (WITH HISTORY) | 1 | CONNECTING POINT INCLUDING EDITING: 0, 1 TO 7f COUNT UP |
| 41.0 | STATUS INFORMATION 2 (WITHOUT HISTORY) | 1 | STARTING POINT OF RECORDING DURING EDITING: 0, 1 TO 7f COUNT UP |
| 42.0 | SEARCH DATA MODE | 1 | SEARCH RECORDING PATTERN |
| 43.0 | | | |
| 43.0 | VIDEO PACK INFORMATION | | 11 |
| 43.0 |     PACK FRAME NUMBER | 1 | NUMBER OF FRAMES IN PACK, NO FF INFORMATION |
| 44.0 |     Picture_Number_from_I-pic | 1 | NUMBER OF FRAMES COUNTING FROM ADJACENT I PICTURE |
| 45.0 |     FIRST FRAME HEADER | | |
| 45.0 |     DATA-H | 1 | |
| 46.0 |     VBV DELAY | 2 | |
| 48.0 |     HEADER SIZE | 1 | FOR CORRECTION OF DIFFERENCE IN VBV DELAY HEADER SIZE |
| 49.0 |     DTS | 5 | |
| 54.0 | VIDEO MODE | 16 | |
| 70.0 | | | |
| 70.0 | EXTENDED DV PACK ENABLE | 1 | DV PACK ENABLE b0 TO b2: 1 TO 3 ENABLE: 1 |
| 71.0 | EXTENDED DV PACK | 15 | CLOSED CAPTURE 4 BYTES + 1KW/FRAME x3 |
| 86.0 | | | |
| 86.0 | RESERVED (VID-FRAME) | 8 | |
| 94.0 | | | |
| | TOTAL | 94 | |

FIG. 16

| SEARCH DATA | (SEARCH RECORDING PATTEN) |
|---|---|
| b0: x4 OPTION | |
| b1: x8 MAIN DATA | |
| b2: x8 HELPER DATA | |
| b3: x16 OPTION | |
| b4: x24 OPTION | |
| b5: x32 OPTION | |
| b6 TO 7: RESERVED | |

FIG. 17

| DATA-H | b3-0 | |
|---|---|---|
| 0: RESERVED | 8: NO PICTURE | STUFFING PACK |
| 1: I PICTURE | 9: UNEDITABLE | |
| 2: P PICTURE | a: RESERVED | |
| 3: B PICTURE | b: RESERVED | A-END |
| 4: COPY PICTURE | c: RESERVED | REC-END |
| 5: V-END | d: RESERVED | AUD |
| 6: RESERVED | e: RESERVED | AUX |
| 7: NO INFORMATION | f: RESERVED | |

FIG. 18

| CONTENT | NUMBER OF BYTES | REMARKS |
|---|---|---|
| ECCTB PACKET HEADER | 1 | DATA = 80 |
| LENGTH (PACKET DATA) | 1 | DATA = 93 |
| SUB-CODE INFORMATION | | SAME CONTENT AS IN SUB-CODE IN FIRST ECC TRACK |
| ATANF (FLE+ATN+FLG) | 5 | RECORD VALUE OF FIRST ECC TRACK |
| EXTENDED TRACK NUMBER | 3 | RECORD VALUE OF FIRST ECC TRACK |
| TTC | 5 | SAME AS SUB-CODE IN FIRST ECC TRACK |
| BINARY GROUP | 5 | WRITTEN IN THE SAME SUB-CODE AS IN TTC |
| DATE/TIME ORIGINAL | 10 | ORIGINAL DATE/TIME WITHOUT CHANGE EVEN AFTER COPYING (USED FOR DISPLAY) |
| DATE/TIME MAIN | 8 | |
| GENERATION NUMBER | 1 | ADD ONE EACH TIME LAST MODIFICATION IS UPDATED |
| | | |
| EDITABLE HEADER MAP | | 25 |
|   Picture_Number_from_I-pic | 1 | NUMBER OF FRAMES COUNTED FROM ADJACENT I PICTURE |
|   FIRST EDITABLE HEADER | | |
|     DATA-H | 1 | PES VIDEO |
|     VBV DELAY | 2 | |
|     HEADER SIZE | 1 | FOR CORRECTION OF DIFFERENCE IN VBV DELAY HEADER SIZE |
|     DTS | 5 | |
|     CONTINUITY COUNTER | 1 | b7-4: AUDIO, b3-0: VIDEO |
|     POSITION (SB) | 1 | AUD-FRAME PACKET (AUX POSITION TO BE EDITED) |
|     POSITION (TRACK) | 1 | |
|   SECOND EDITABLE HEADER | | |
|     DATA-H | 1 | PES VIDEO |
|     VBV DELAY | 2 | |
|     HEADER SIZE | 1 | FOR CORRECTION OF DIFFERENCE IN VBV DELAY HEADER SIZE |
|     DTS | 5 | |
|     CONTINUITY COUNTER | 1 | b7-4: AUDIO, b3-0: VIDEO |
|     POSITION (SB) | 1 | AUDIO AUX |
|     POSITION (TRACK) | 1 | (POSITION OF FIRST DATA IN SECOND EDITABLE HEADER) |
| EDIT STATUS ECC | 1 | COUNT UP TO 0, 7f FOR EVERY ECC AT EDITING POINT |
| SEARCH DATA MODE | 1 | SEARCH RECORDING PATTERN |
| SEARCH PCS | 1 | INDICATE SEARCH DATA RECORDING INFORMATION |
| SEARCH DATA BLOCK NUMBER | 1 | DATA DIVISION NUMBER AT x8 SPEED (1 TO 9) 00, FF: NO INFORMATION |
| VIDEO MODE | 16 | SAME CONTENT AS IN VID-frame AUDIO MODE |
| AUDIO MODE | 10 | SAME CONTENT AS IN AUD-frame VIDEO MODE |
| RESERVED | 1 | |
| TOTAL | 95 | |

FIG. 19

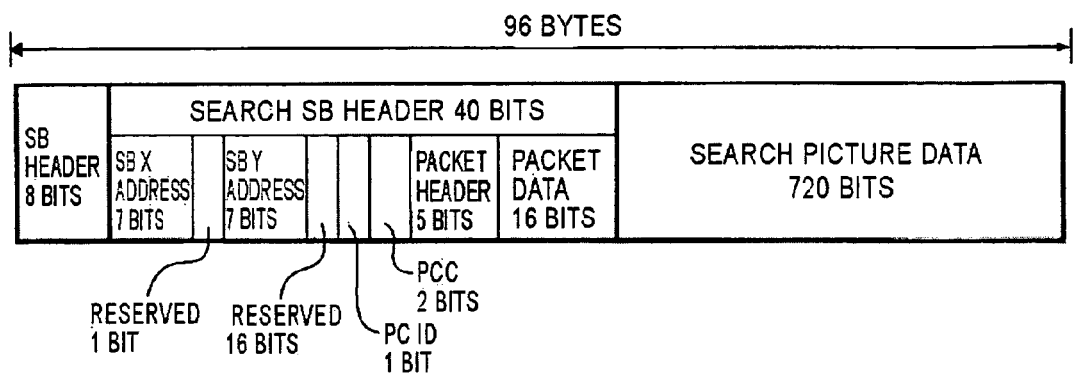

FIG. 20

| PACKET HEADER | CONTENT | L/H | REMARKS |
|---|---|---|---|
| 0 | SH | L | SEARCH HEADER (IMAGE INFORMATION) |
| 1 | SH | H | SEARCH HEADER (IMAGE INFORMATION) |
| 2 | TTC | L | CONTENT OF SUB-CODE |
| 3 | TTC | H | |
| 4 | RECORDING TIME | L | |
| 5 | RECORDING TIME | H | |
| 6 | RECORDING DATE | L | |
| 7 | RECORDING DATE | H | |
| 8 | ATN+FLG | L | |
| 9 | ATN+FLG | H | |
| 10 | ETN | L | |
| 11 | ETN | H | |
| 12 | BINARY GROUP | L | |
| 13 | BINARY GROUP | H | |
| 14 | PART NO. | L | (FOR RECORDED TAPE) |
| 15 | PART NO. | H | (FOR RECORDED TAPE) |
| 16 | CHAPTER START | L | (FOR RECORDED TAPE) |
| 17 | CHAPTER START | H | (FOR RECORDED TAPE) |
| 16~31 | RESERVED | | RESERVED |

Rows 0–7: FOR DISPLAY
Rows 8–17: FOR SEARCH POSITIONAL INFORMATION

|  | MSB　　　　　　　　　　　　　　LSB |
|---|---|
| SINK PATTERN S0 | 1 0 0 1 1 1 1 1 1 1 1 1 1 0 0 0 |
| SINK PATTERN S1 | 0 1 1 0 0 0 0 0 0 0 0 0 1 1 1 1 |

FIG. 23

| SB No. | ID0 | | ID1 | | ID2 | |
|---|---|---|---|---|---|---|
| | | | MSB | LSB | MSB | LSB |
| 0 | F_TYPE | TRACK PAIR NUMBER | RESERVED | SB NUMBER | OVERWRITE PROTECT | OVERWRITE PROTECT |
| 1 | F_TYPE | TRACK PAIR NUMBER | RESERVED | SB NUMBER | OVERWRITE PROTECT | OVERWRITE PROTECT |
| 2 | F_TYPE | TRACK PAIR NUMBER | RESERVED | SB NUMBER | OVERWRITE PROTECT | OVERWRITE PROTECT |
| 3 | F_TYPE | TRACK PAIR NUMBER | RESERVED | SB NUMBER | OVERWRITE PROTECT | OVERWRITE PROTECT |
| 4 | F_TYPE | TRACK PAIR NUMBER | RESERVED | SB NUMBER | OVERWRITE PROTECT | OVERWRITE PROTECT |
| 5 | F_TYPE | TRACK PAIR NUMBER | RESERVED | SB NUMBER | OVERWRITE PROTECT | OVERWRITE PROTECT |
| 6 | F_TYPE | TRACK PAIR NUMBER | RESERVED | SB NUMBER | OVERWRITE PROTECT | OVERWRITE PROTECT |
| 7 | F_TYPE | TRACK PAIR NUMBER | RESERVED | SB NUMBER | OVERWRITE PROTECT | OVERWRITE PROTECT |
| 8 | F_TYPE | TRACK PAIR NUMBER | RESERVED | SB NUMBER | OVERWRITE PROTECT | OVERWRITE PROTECT |
| 9 | F_TYPE | TRACK PAIR NUMBER | RESERVED | SB NUMBER | | |

FIG. 24

| SB No. | EVEN-NUMBERED PAIR TRACK 0 | | ODD-NUMBERED PAIR TRACK 1 | |
|---|---|---|---|---|
| | 0 | 1 | 2 | 3 |
| | FIRST EVEN-NUMBERED PAIR TRACK | SECOND EVEN-NUMBERED PAIR TRACK | FIRST ODD-NUMBERED PAIR TRACK | SECOND ODD-NUMBERED PAIR TRACK |
| 0 | FLE+ATNF | FLE+ATNF | FLE+ATNF | FLE+ATNF |
| 1 | ETN | ETN | TTC | TTC |
| 2 | TTC | TTC | RECORDING DATE | RECORDING DATE |
| 3 | NO INFORMATION | NO INFORMATION | RECORDING TIME | RECORDING TIME |
| 4 | FLE+ATNF | FLE+ATNF | FLE+ATNF | FLE+ATNF |
| 5 | TTC | TTC | ETN | ETN |
| 6 | ETN | ETN | TTC | TTC |
| 7 | TTC | TTC | RECORDING DATE | RECORDING DATE |
| 8 | NO INFORMATION | NO INFORMATION | RECORDING TIME | RECORDING TIME |
| 9 | FLE+ATNF | FLE+ATNF | FLE+ATNF | FLE+ATNF |

FIG. 25

| BYTE POSITION NUMBER | FIXED DATA AREA (RECORDED IN NON-PACKET STRUCTURE) | | | | | | | |
|---|---|---|---|---|---|---|---|---|
| | 7 | 6 | 5 | 4 | 3 | 2 | 1 | 0 |
| D0 | FLE | | | | | | | |
| D1 | | | | | | | LSB | BF |
| D2 | ATN 23 BITS (BINARY) | | | | | | | |
| D3 | MSB | | | | | | | |
| D4 | FLG | | | | | | | |

FIG. 26

| | | FLE | |
|---|---|---|---|
| BIT | NAME | CONTENT OF DATA | DETAILED DATA |
| 7 | SF1 | PRESENCE OF x8 SEARCH HELPER | 0: WITH HELPER, 1: WITHOUT HELPER |
| 6 | SF2 | PRESENCE OF x24 SEARCH DATA | 0: WITH DATA, 1: WITHOUT DATA |
| 5 | SPH | x24 SEARCH PHASE (0 - 2) | PERIOD COUNTER OF 0, 1, AND 2 REMAINDER OF DIVIDING QUOTIENT GIVEN BY DIVIDING ETN BY 16 BY 3 |
| 4 | | | |
| 3 | EPO | EDIT PICTURE OFFSET (0 - 15) | PHASE DIFFERENCE FROM MAIN DATA VARY FOR EVERY FRAME 15 = NO INFORMATION |
| 2 | | | |
| 1 | | | |
| 0 | | | |

FIG. 27

| | | FLG | |
|---|---|---|---|
| BIT | NAME | CONTENT OF DATA | DETAILED DATA |
| 7 | I | INDEX ID | SEARCH POINT MARK (CORRESPONDING TO DV) |
| 6 | - | RESERVED | |
| 5 | P | PP ID | MARK FOR STILL-PICTURE SEARCH (CORRESPONDING TO DV) |
| 4 | - | RESERVED | |
| 3 | EF | REC END ECC FLAG | GENERATE USING ALTAIR |
| 2 | PF | PICTURE TYPE FLAG (0 - 7) | GENERATE USING ALTAIR 1 = I PICTURE, 2 = B PICTURE, 3 = P PICTURE, 4 = C PICTURE, 5 = V-END, 7 = NO INFORMATION |
| 1 | | | |
| 0 | | | |

FIG. 28

| BYTE POSITION NUMBER | ETE | | | | | | | |
|---|---|---|---|---|---|---|---|---|
| | 7 | 6 | 5 | 4 | 3 | 2 | 1 | 0 |
| D0 | 0 | 0 | 7 | | | | | |
| D1 | | | | | | | | LSB |
| D2 | ETN 24 BITS | | | | | | | |
| D3 | MSB | | | | | | | |
| D4 | RESERVED | | | | | | | |

FIG. 29

| | TITLE 3: TIME CODE : TTC OR TC | | | | | | | |
|---|---|---|---|---|---|---|---|---|
| | 7 | 6 | 5 | 4 | 3 | 2 | 1 | 0 |
| PC0 | 0 | 0 | 0 | 1 | 0 | 0 | 1 | 1 |
| PC1 | S2/BF | S1 | FRAME POSITIVE POSITION | | | FRAME NEGATIVE POSITION | | |
| PC2 | S3 | SECOND POSITIVE POSITION | | | | SECOND NEGATIVE POSITION | | |
| PC3 | S4 | MINUTE POSITIVE POSITION | | | | MINUTE NEGATIVE POSITION | | |
| PC4 | S6 | S5 | HOUR POSITIVE POSITION | | | HOUR NEGATIVE POSITION | | |

VIDEO TAPE RECORDER AND RECORDING METHOD

BACKGROUND OF THE INVENTION

1. Technical Field

The present invention relates to a video tape recorder and a method of recording data on a magnetic tape. Particularly, the present invention can be applied to a video tape recorder that records a video signal of an HDTV (high definition television) on a magnetic tape. The entire video tape recorder according to the present invention can efficiently be structured by setting the recording position of the head of each pack unit so as to have a predetermined relationship with the recording position determined by the corresponding time management information.

2. Background Art

Heretofore, video tape recorders for recording and/or reproducing video signals of HDTVs (hereinafter referred to as HD signals) have been suggested in, for example, Japanese Unexamined Patent Application Publication No. 2001-291335.

Japanese Unexamined Patent Application Publication No. 2001-291335 discloses a video tape recorder that effectively utilizes a magnetic tape to record HD signals by compiling various signals relating to the HD signals into the first areas of multiple tracks to be subjected to interleave in units of allocation cycles of I pictures and recording the compiled signals.

However, it would appear that various devices are further required for practical use in a video tape recorder of this type for recording HD signals. Specifically, it seems that the entire structure can be simplified and, furthermore, a variety of processing can be simplified if the recording and reproduction systems can further efficiently be structured.

DISCLOSURE OF INVENTION

In consideration of the above problems, the present invention provides a video tape recorder capable of being efficiently structured and a recoding method.

In order to solve the above problems, the present invention is applied to a video tape recorder in which the delay time of delay means is varied such that the recording position of the head of each pack unit has a predetermined relationship with the recording position determined by the corresponding time management information.

With the structure of the video tape recorder according to the present invention, since the delay time of the delay means is varied such that the recording position of the head of each pack unit has a predetermined relationship with the recording position determined by the corresponding time management information, each pack unit can be recorded on the magnetic tape in anticipation of a margin in the reproduction. Accordingly, a space required for a buffer memory in the reproduction side can be decreased and the buffer memory can be appropriated for other processing, if required, thus efficiently structuring the entire video tape recorder.

The present invention is applied to a video tape recorder in which the management information serving as a reproduction reference, the management information being generated from time management information when the video data is decompressed and output, is generated such that the management information serving as the reproduction reference is varied in proportion to a clock serving as a processing reference when the video data is decompressed.

With the structure of the video tape recorder according to the present invention, the management information serving as a reproduction reference, the management information being generated from time management information when the video data is decompressed and output, is generated such that the management information serving as the reproduction reference is varied in proportion to a clock serving as a processing reference when the video data is decompressed. Hence, a simple process can determine the relationship between the management information serving as the reproduction reference and the process of decompressing the data. In addition, this determination result can be utilized in a variety of processing, thus efficiently structuring the entire video tape recorder.

The present invention is applied to a method of recording data on a magnetic tape. The recording method includes a pack-unit generating step of blocking the video data in units of a predetermined number of blocks to generate a pack unit including a combination of the video data in the block, the corresponding audio data, and the related data; a management-information generating step of generating management information serving as a reproduction reference when the video data is reproduced from the magnetic tape, from time management information when the video data is decompressed and output; a delay step of delaying the pack-unit; a recording step of recording the pack unit on the magnetic tape along with the management information serving as the reproduction reference; and a controlling step of varying a delay time generated in the delay step. The controlling step varies the delay time such that the recording position of the head of each pack unit is set to a position having a predetermined relationship with the recording position determined by the management information serving as the corresponding reproduction reference.

The present invention is applied to a method of recording data on a magnetic tape. The recording method includes a pack-unit generating step of blocking the video data in units of a predetermined number of blocks to generate a pack unit including a combination of the video data in the block, the corresponding audio data, and the related data; a management-information generating step of generating management information serving as a reproduction reference when the video data is reproduced from the magnetic tape, from time management information when the video data is decompressed and output; and a recording step of recording the data in the pack unit on the magnetic tape along with the management information serving as the reproduction reference. The management-information generating step generates the management information serving as the reproduction reference such that the management information serving as the reproduction reference is varied in proportion to a clock serving as a processing reference when the video data is decompressed.

With the structure described above according to the present invention, it is possible to provide a recording method capable of efficiently recording the data on the magnetic tape.

BRIEF DESCRIPTION OF THE DRAWINGS

FIG. 5 is a diagram showing a sink pattern.

FIG. 6 is a diagram showing an ID.

FIG. 7 includes diagrams showing a sink block header.

FIG. 8 is a diagram showing an average allocation of logical data in the main sector.

FIG. 12 is a diagram showing keyword numbers.

FIG. 13 is a diagram showing the keyword numbers in the variable-length packet structure.

FIG. 14 is a diagram showing an audio frame packet.

FIG. 15 is a diagram showing a video frame packet.

FIG. 16 is a diagram illustrating a search mode.

FIG. 17 is a diagram illustrating search data.

FIG. 18 is a diagram showing an ECCTB packet.

FIG. 19 is a diagram showing the structure of a sink block when the search data is allocated to the main data.

FIG. 20 is a diagram showing a packet header.

FIG. 23 is a diagram showing the ID in the sub-code sector.

FIG. 24 is a diagram showing the content of the sub-code data in the sub-code sector.

FIG. 25 is a diagram showing the structure of the sub-code data in sub-code sink block numbers 0, 4, and 9.

FIG. 26 is a diagram showing the settings of flags.

FIG. 27 is a diagram showing the setting of the flag in a least significant bit.

FIG. 28 is a diagram showing a sub-code to which an extended track number is allocated.

FIG. 29 is a diagram showing a sub-code to which a title time code is allocated.

BEST MODE FOR CARRYING OUT THE INVENTION

Embodiments of the present invention will be described below with reference to the attached drawings.

(1) Structure of First Embodiment (1-1) Recording Format

Figure 1:
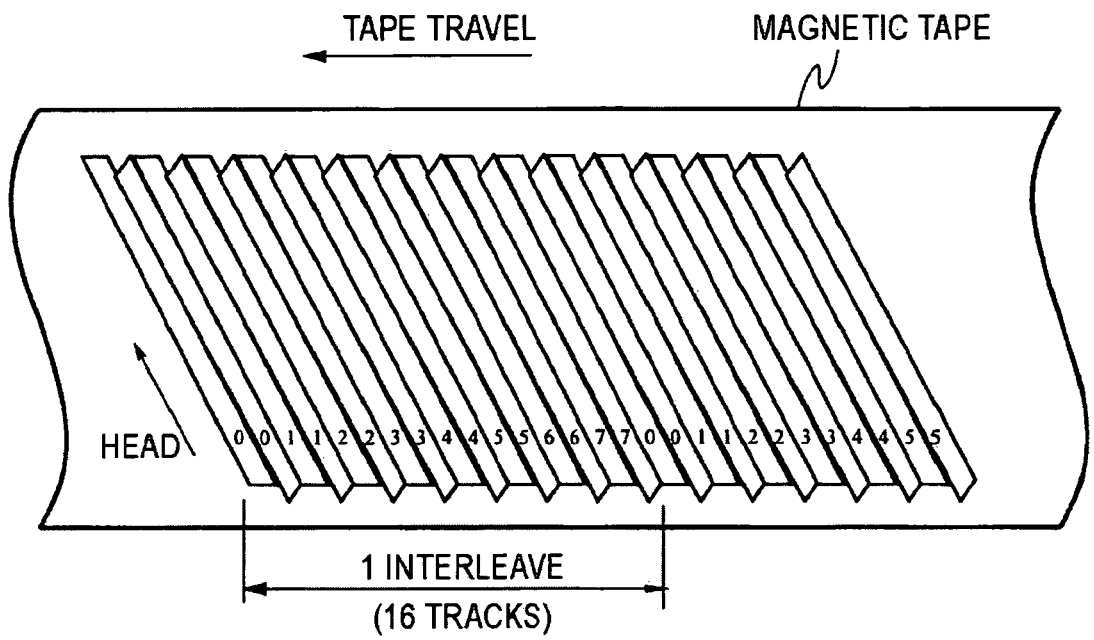
FIG. 1 is a plan view showing a tape format in a video tape recorder according to an embodiment of the present invention.

FIG. 1 is a plan view showing a recoding format when a video tape recorder according to an embodiment of the present invention records data on a magnetic tape. The video tape recorder uses a magnetic-tape traveling system approximately the same as in a video tape recorder in a digital video (DV) mode. Accordingly, pairs of diagonal tracks (track pairs) having approximately the same pattern as that of a video tape recorder in the DV mode are continuously formed on the magnetic tape. One diagonal track in each pair has a positive azimuth angle and the other diagonal track therein has a negative azimuth angle. Referring to FIG. 1, HEAD denotes the scanning direction of a magnetic head and TAPE TRAVEL denotes the traveling direction of the magnetic tape. Recording tracks are sequentially produced at a speed of about 300 tracks/sec. The recording rate on the magnetic tape is set to about 40 [Mbps].

A recording track having no pilot signal recorded therein, a recording track having a pilot signal of a frequency F0 recorded therein, and a recording track having a pilot signal of a frequency F1 recorded therein are sequentially and circularly formed on the magnetic tape. In this structure, the magnetic tape is subjected to tracking control based on the pilot signals. The recording frequency of channel bits of data recorded on each of the recording tracks is set so as to be 1/90 and 1/60 with respect to the frequencies F0 and F1, respectively.

In a sequence of tracks formed in the manner described above in the video tape recorder of this embodiment, 16 tracks are set to an interleave processing unit or an error correction process unit (ECC block). The data recorded on the 16 tracks is sequentially compiled into one block and an interleave process or an error correction process is performed in each block. Track pair numbers from 0 to 31 are sequentially and circularly allocated to the track pairs of the recording tracks. The track pair number of the first track pair for interleave is set to 0, 7, 15, or 23.

Figure 2:
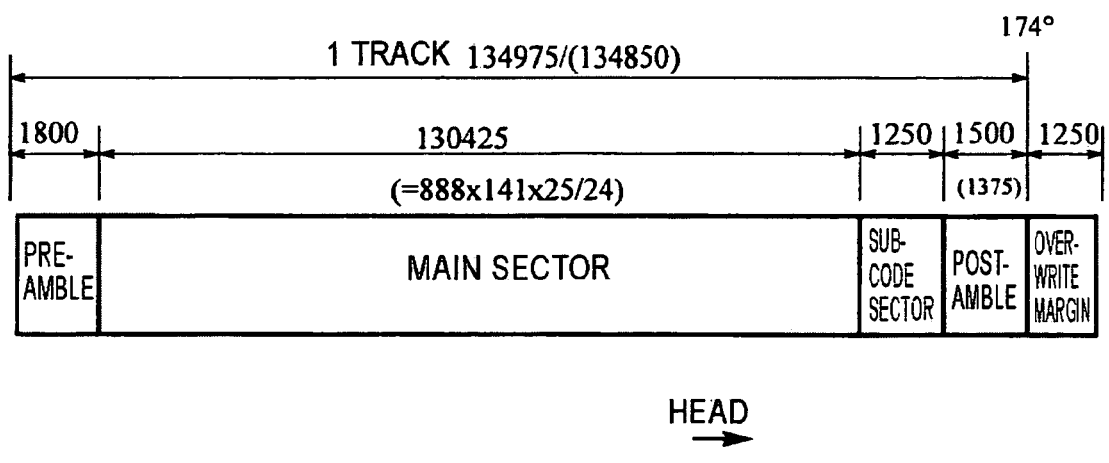
FIG. 2 is a diagram showing an allocation of sectors in the tape format in FIG. 1.

FIG. 2 is a diagram showing a sector format in each of the recording tracks formed in the manner described above. A preamble, a main sector, a sub-code sector, a postamble, and an overwrite margin are continuously formed on the recording track from the side of the magnetic head where the scanning is started. On the recording track, a range where the magnetic tape is wound around a rotating drum at an angle of 174° measured from the side where the scanning is started is allocated to these preamble, main sector, sub-code sector, and postamble. When video data having a field frequency of 59.94 [Hz] is recorded (when the rotating drum mounted on the magnetic head rotates at a rotational speed of 60×1000/1001 [Hz]), data of 134975 bits, represented by the amount of data after 24-to-25 modulation described below, is recorded in this range. When video data having a field frequency of 50 [Hz] is recorded (when the rotating drum rotates at a rotational speed of 60 [Hz]), data of 134850 bits is recorded in this range.

Figures 3, 4:
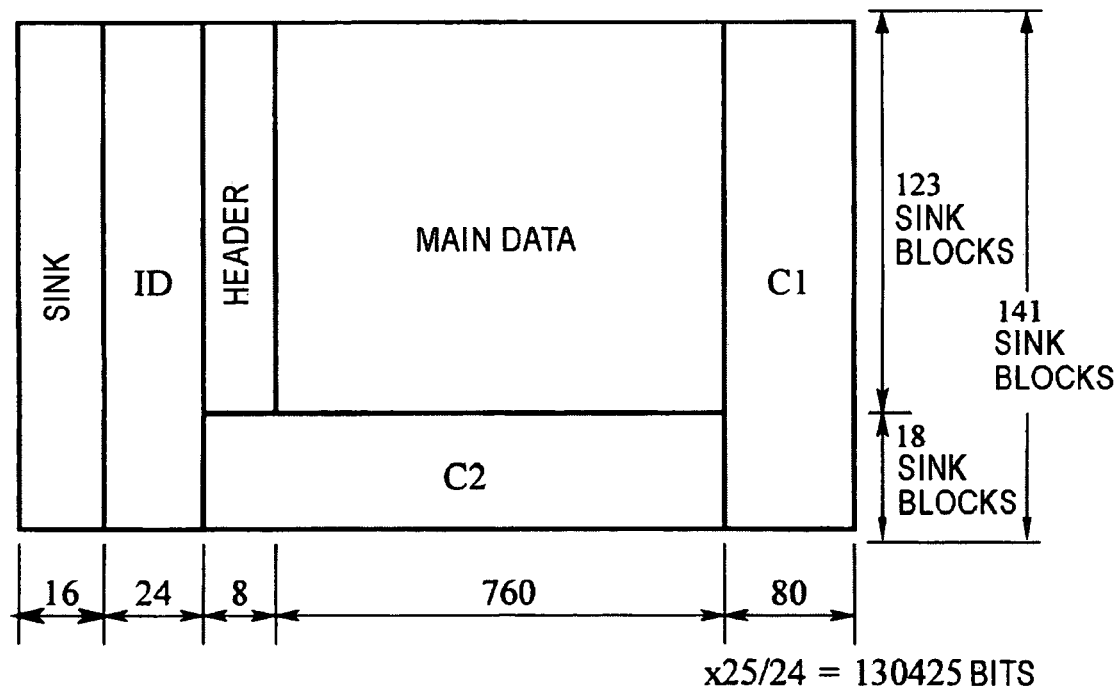
FIG. 3 is a diagram showing a pattern of a preamble.
FIG. 4 is a diagram showing the structure of a main sector.

In the preamble, data of 1800 bits, required for locking a PLL circuit during reproduction, is recorded. FIG. 3 is a diagram showing recording patterns in the preamble. According to this embodiment, a combination of a pattern A and a pattern B formed by inverting the bits of the pattern A is allocated to each recording track to form a combination of the pilot signals described above.

In the main sector, video data or the like used in ordinary reproduction or in search is recorded in units of sink blocks described below. A total of 130425 bits is ensured for the main sector. In the sub-code sector, sub-codes are recorded. The sub-codes are data provided for, for example, searching positions in a high-speed search. An area corresponding to 1250 bits is ensured for the sub-code sector. For the postamble, an area corresponding to 1500 bits is ensured when the rotating drum rotates at a rotational speed of 60×1000/1001 [Hz] (when the field frequency is 59.94 [Hz]), and an area corresponding to 1375 bits is ensured when the rotating drum rotates at a rotational speed of 60 [Hz] (when the field frequency is 50 [Hz]). The postamble is structured in the same manner as in the preamble.

The overwrite margin is provided for ensuring a margin during overwriting. An area corresponding to 1250 bits is ensured for the overwrite margin.

FIG. 4 is a diagram showing the basic structure of the main sector. The amount of data before the 24-to-25 modulation is shown in FIG. 4. The main sector has 141 sink blocks each having 888 bits (111 bytes). A 16-bit sink and a 24-bit ID are allocated to the head of each sink block, and a CI code, which is an inner code of an error correcting code in a product code mode, is allocated to trail 80 bits. In 123 sink blocks, among 141 sink blocks, in the main sector, an 8-bit header (sink block header) and main data of 760 bits are allocated to the remaining 768 bits. In contrast, in the remaining 18 sink blocks, a C2 code, which is an outer code of the error correcting code in the product code mode, is allocated to the remaining 768 bits.

The sink is provided for detecting the position of each sink block. A pattern M0 and a pattern M1 formed by inverting the bits of the pattern M0, shown in FIG. 5, are alternately allocated to the sink.

The ID is provided for, for example, identifying the sink block, as auxiliary data for the error correction. The ID has three kinds of ID0 to ID2 shown in FIG. 6. Specifically, in the ID, first eight bits from 0 to 7 are set to the first ID0. The five bits from 0 to 4 in the first ID0 represent the track pair numbers.

In the first three bits from 5 to 7 in the first ID0 in the ID, the format of the track, described above with reference to FIG. 2, is recorded. That is, identification information concerning the track is allocated to the first ID0.

In contrast, sink block numbers for identifying the sink blocks are allocated to the second ID1.

Information for determining whether the main sector is newly created or remains as a result of deletion of previous data relating to overwriting during editing or the like, is allocated to the third ID2 as overwrite protect data. Accordingly, in this video tape recorder, when previous data cannot be completely deleted due to head clock or the like during overwriting, erasure correction is performed by using only the C2 code in order not to erroneously reproduce the previous data.

FIG. 7 includes diagrams showing the sink block header. In the sink block header, bits from b7 to b5 represent a data type indicating the kind of the main data, and bits from b4 to b0 represent detailed information of each data type. Specifically, when null data having no meaning is allocated to the main data to form an empty sink block, the bits from b7 to b5 are set to a value of zero and the bits from b4 to b0 are reserved.

When auxiliary data (AUX) of the video data and audio data is allocated to the main data, the bits from b7 to b5 are set to a value of one. In this case, a mode (AUX mode) of this auxiliary data is allocated to the bits from b4 to b2. When the auxiliary data is auxiliary data relating to packetized elementary stream (PES) video data (AUX-V), the bits from b4 to b2 are set to a value of zero. When the auxiliary data is auxiliary data relating to PES audio data (AUX-A), the bits from b4 to b2 are set to a value of one. The PES video data and the PES audio data are video data and audio data that are mainly recorded and reproduced by the video tape recorder of this embodiment and that conform to an MPEG2-PES format.

When the auxiliary data is a first half of a program specific information (PSI) packet conforming to the MPEG2-PES format (PES-PSI1), the bits from b4 to b2 are set to a value of two. When the auxiliary data is a last half of the PSI packet (PES-PSI2), the bits from b4 to b2 are set to a value of three. When the auxiliary data is data of an ECCTB packet described below, the bits from b4 to b2 are set to a value of four. When large meta data is allocated to the auxiliary data (AUX-M), the bits from b4 to b2 are set to a value of five. Values of six and seven in the bits from b4 to b2 are reserved. System data, here, is data relating to a control sequence. The system data includes text information concerning copyright, a situation in the capture of images, or the like, which has been externally input as additional video or audio data; a title time code (TTC), which is auxiliary data for search, editing, or the like; track position information; installing information of the device; and so on.

Corresponding to these values, a flag DF indicating an invalid recording area in the recording in the ECCTB is allocated to the bit b1 or a flag FRC indicating a reversed polarity in a boundary between frames in the main data is allocated to the bit b1. A flag SBSC indicating an on state of scramble control in the sink block header is allocated to the bit b0. The bit b1 is allocated to the flag FRC when the bits from b4 to b2 are set to a value of zero or five, is allocated to the flag DF when the bits from b4 to b2 are set to a value of four, and is reserved when the bits from b4 to b2 are set to values other than zero, five, and four.

In contrast, when the main data is video data conforming to the MPEG2-PES format (PES-VIDEO), the bits from b7 to b5 are set to a value of two. When the main data is audio data conforming to the MPEG2-PES format (PES-AUDIO), the bits from b7 to b5 are set to a value of three. In these two cases, the bit b4 indicates whether the data is partial (95 bytes or less) or full (95 bytes). A continuity counter value is allocated to the bits from b3 to b0.

In contrast, when the main data is a first half of data recorded in a transport stream format (TS-1H), the bits from b7 to b5 are set to a value of four, a jump flag is allocated to the bits b4 and b3, and a time stamp is allocated to the bits from b2 to b0. When the main data is a last half of the data recorded in the transport stream format (TS-2H), the bits from b7 to b5 are set to a value of five, and a continuity counter value is set to the bits from b4 to b0.

When the main data is search data (SEARCH), the bits from b7 to b5 are set to a value of six and the bit b4 is reserved. In this case, the corresponding search speed is recorded in the bits from b3 to b1, and the flag SBSC indicating an on state of the scramble control is allocated to the bit b0. The search data is data of low-frequency components of an I picture. When the bits from b3 to b1 are set to a value of two or four, the search data is set so as to instruct an 8× or 24× search speed, respectively. The value 7 in the bits from b3 to b1 is reserved.

FIG. 8 is a diagram showing an average allocation of logical data in the data structure of the main sector formed in the manner described above. A C2 code is allocated to eighteen sink blocks such that error correction can be continuously performed for two tracks or more (=12.5% (=two tracks/16-track ECC (error correcting code) interleave)) to set the continuous error correction rate to 12.7 [%]. The auxiliary data (AUX)+the NULL data is set to 95 bytes×2.2 SB×300 tracks×8 bits=501 [Kbps], the video data is set to 95 bytes× 110 SB×300 track×8 bits=25.021 [Mbps], the audio data is set to 95 bytes×1.8 SB×300 tracks×8 bits=421 [Kbps], and the search data is set to 95 bytes×9.1 SB×300 tracks×8 bits=2.07 [Mbps]. These figures add up to a total of 28.044 [Mbps] (95 bytes×123 SB×300 tracks×8 bits). Hereinafter, the sink block is appropriately denoted by SB.

As described above, the video data, the audio data, and the corresponding system data (auxiliary data) are sequentially allocated and recorded as the main data in the main sector on the magnetic tape.

Figure 9:
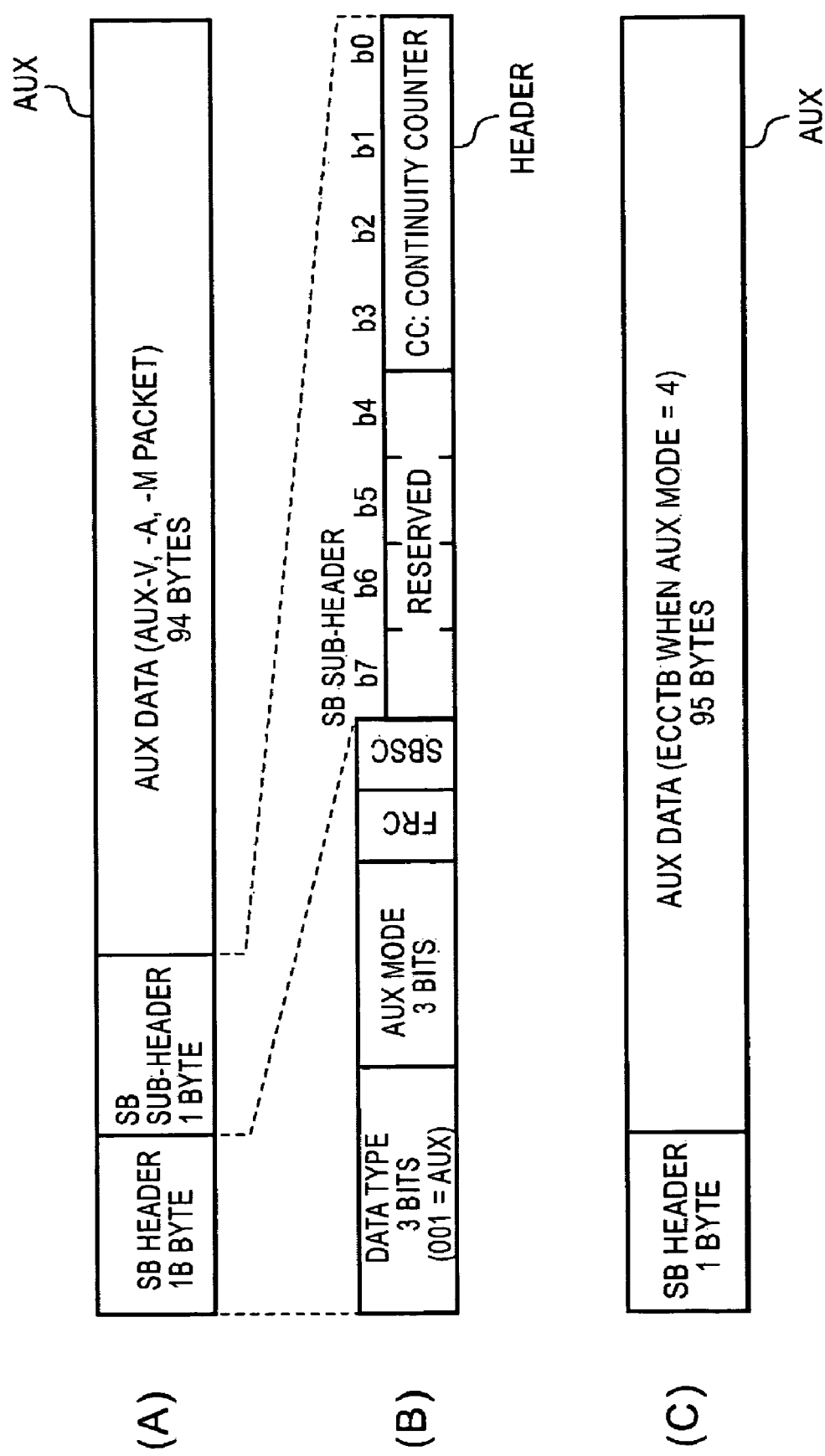
FIG. 9 includes diagrams showing the structure of a sink block when auxiliary data is allocated to main data.

FIG. 9 includes diagrams showing the structure of the sink block when the auxiliary data is allocated to the main data. When a mode (AUX mode) of the auxiliary data is a value of zero (the auxiliary data is auxiliary data concerning the video data (AUX-V)), is a value of one (the auxiliary data is auxiliary data concerning the PES audio data (AUX-A), or is a value of five (large metadata is allocated (AUX-M)), a first byte in a main data area subsequent to the sink header is allocated to a sub-header in each sink block (FIGS. 9(A) and 9(B)).

In the sub-header, bits from b7 to b4 are reserved and bits from b3 to b0 are allocated to a continuity counter value. The sub-header is provided for detecting the continuity of data based on the continuity counter value when the auxiliary data is allocated across multiple sink blocks. Accordingly, this continuity counter value can be reproduced without fail by setting an independent continuity counter value for every mode of the auxiliary data even when a plurality of pieces of the auxiliary data is irregularly allocated. Incidentally, the sub-header is not provided in the ECCTB packet because the auxiliary data, which is the system data and is recorded in the ECCTB packet, is regularly allocated and the auxiliary data has continuity. The ECCTB packet is a sink block allocated for recording the head of the ECC block, which will be described in detail below.

The auxiliary data in the data allocated to the main sector is allocated to the main data described above with reference to FIG. 4. The auxiliary data has packet structures shown in FIGS. 10 and 11.

Figure 10:
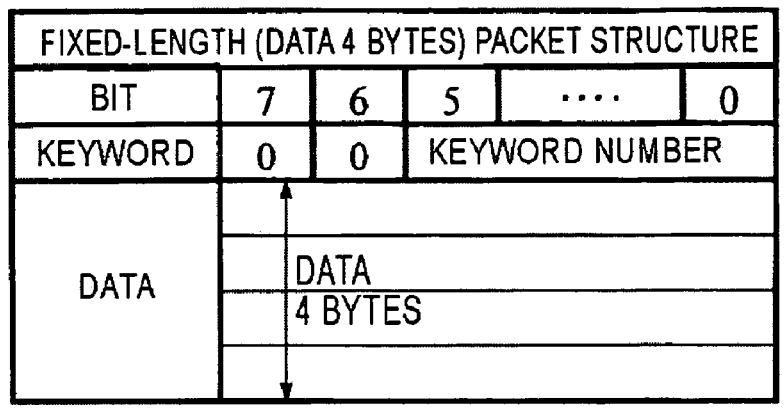
FIG. 10 is a diagram showing a fixed-length packet structure.
Figure 11:
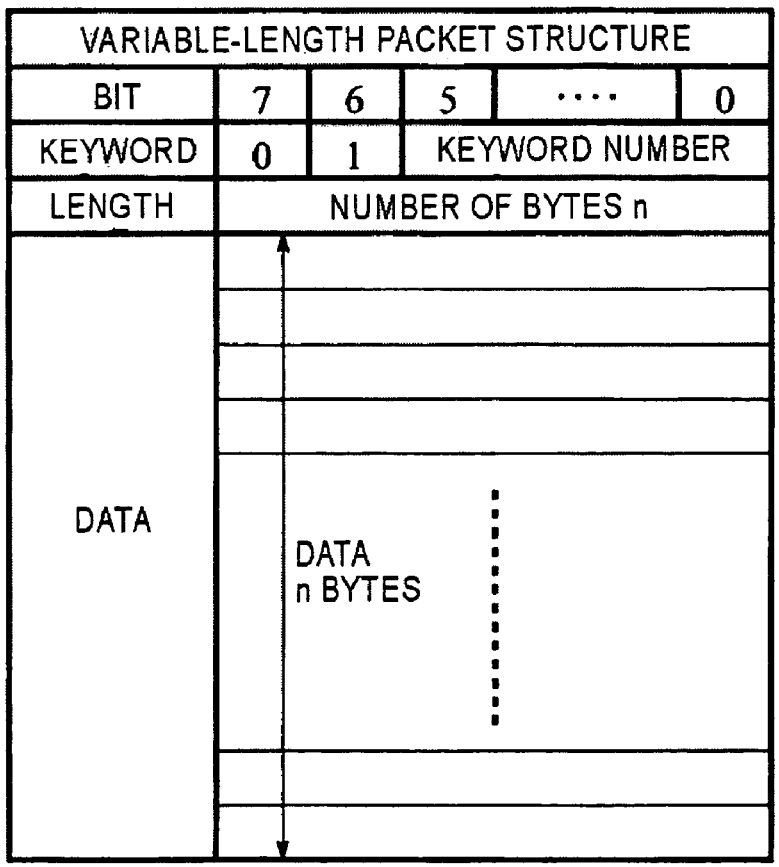
FIG. 11 is a diagram showing a variable-length packet structure.

FIG. 10 is a diagram showing a packet structure of fixed-length auxiliary data and FIG. 11 is a diagram showing a packet structure of variable-length auxiliary data. The packet structure of the fixed-length auxiliary data is mainly allocated to the sub-code sector while also being allocated to the main sector. The entire packet structure of the fixed-length auxiliary data has five bytes. Bits b7 and b6 in a first byte are set to a value of zero, a keyword number indicating the content of each auxiliary data is allocated to bits from b5 to b0, and the remaining four bytes are allocated to the auxiliary data.

In contrast, in the packet structure of the variable-length auxiliary data, bits b7 and b6 in a first byte are set to values of zero and one, respectively, and a keyword number indicating the content of each auxiliary data is allocated to bits from b5 to b0. A number n of bytes of subsequent auxiliary data is recorded in the subsequent one byte to detect the length of the packet. The auxiliary data is allocated to the remaining n bytes.

FIG. 12 is a diagram showing the keyword numbers in the packet structure of the fixed-length auxiliary data. A series of numbers are allocated to the keyword number in the packet structure of the fixed-length auxiliary data and the packet structure of the variable-length auxiliary data. Values from 0 to 63 are allocated to the packet structure of the fixed-length auxiliary data. The values from 0 to 7, among the 63 values, are applied to the sub-code sector. A value of zero indicates that the subsequent four bytes denote a title time code (TTC). A value of one in the keyword number indicates that the subsequent four bytes are data in a binary group, and a value of two in the keyword number indicates that the subsequent four bytes denote a part number.

A value of four in the keyword number indicates that the subsequent four bytes denote tape position information (ATNF) and a predetermined flag (FLG). The tape position information is 23-bit absolute-position information and is represented by a track number (ATN: absolute track number) counted from the head of the tape to each recording track. The flag (FLG) is set to a value of one when the tape position information is not continuous. It is possible to perform the search without fail by determining the continuity of a sequence of tracks based on the value of the flag (FLG). A value of five indicates that the subsequent four bytes denote a recording date and a value of six indicates that the subsequent four bytes denote a recording time. A value of seven indicates that the subsequent four bytes denote an extended track number (ETN).

The extended track number ETN is management information serving as a reproduction reference when the video data is reproduced from the magnetic tape. A value representing time management information DTS (decoding time stamp) by using the track number according to the following relational expression is applied to the extended track number ETN so as to be in proportion to the time management information DTS (decoding time stamp) of the video data in the decoding and so as to be in proportion to a system time clock STC that is an operation reference in the decoding and that is an operation reference of the video tape recorder. The extended track number ETN is represented by 24 bits. The content of bits from b4 to b0 denotes the track number in the ECC and the content of bits from b5 to b1 coincides with the track pair number. The track number in the ECC is a number when the first track of the ECC is set to a value of zero. The time management information DTS in the decoding is a count value at a frequency of 90 [kHz] and is an output reference of the decoded and decompressed video data.

With respect to the title time code TTC, when the recording format is applied to a system having a field frequency of 59.94 [Hz], the TTC is repeatedly allocated in a cycle of 10 tracks and the ETN is represented by an integral multiple of 10 at the beginning of the TTC. When the recording format is applied to a system having a field frequency of 50 [Hz], the TTC is repeatedly allocated in a cycle of 12 tracks and the ETN is represented by an integral multiple of 12 at the beginning of the TTC.

Accordingly, according to this embodiment, when the recording format is applied to a system having a field frequency of 59.94 [Hz], the extended track number is represented by DTS=EFN×3003=ETN×3003/10. When the recording format is applied to a system having a field frequency of 50 [Hz], the extended track number is represented by DTS=EFN×3600=ETN×3600/12. The EFN denotes an extended frame number, which is a frame number corresponding to the extended track number ETN. In the first ID0, values from 8 to 62 are reserved and a value of 63 indicates that the subsequent four bytes are null.

FIG. 13 is a diagram showing the keyword numbers in the packet structure of the variable-length auxiliary data. Values from 64 to 127 are allocated to the packet structure of the variable-length auxiliary data. Among these keyword numbers, values from 64 to 67 are allocated to the auxiliary data of the audio data. The value 64 indicates that the auxiliary data of the audio data is allocated to the subsequent variable data. The remaining values from 65 to 67 are reserved.

Values from 68 to 79 are allocated to the auxiliary data of the video data. The value 68 indicates that the auxiliary data of the video data is allocated to the subsequent variable data. The value 73 indicates that the subsequent variable data is data compatible with the DV mode. The values of 77 and 78 indicate that the subsequent variable data is data of a message in an ASCII code and a message in a shift JIS code, respectively. The value 79 indicates that the subsequent variable data is binary data.

Values from 80 to 83 are allocated to the system. The value 80 indicates that the subsequent variable data forms an ECCTB packet. Values from 84 to 119 are reserved. Values from 120 to 126 indicate that the subsequent variable data is large metadata. A value of 127 indicates that the subsequent variable data is null to form a null packet.

FIG. 14 is a diagram showing an audio frame packet when the keyword number is set to a value of 64, among these settings of the keyword number. As described above in the packet structure in FIG. 11, in the audio frame packet, a first byte is set to the keyword number having a value of 64 and a number n of subsequent bytes (=92) is allocated to the subsequent one byte. An operation mode for outputting a transport stream is set to the subsequent one byte. A VTR mode, tape position information (ATNF) and various flags (EFL and FLG), and a title time code, which have the same content as those of the corresponding video frame, are allocated to the subsequent five, three, and five bytes, respectively. In this manner, a pack pair of the corresponding video data can easily be identified in a pack unit. The pack unit means a combination of the corresponding video data, audio data, and system data. These various flags (EFL and FLG) will be described in detail in a description of a packet corresponding to the sub-codes described below.

Information concerning an original recording date and time is allocated to the subsequent 10 bytes, information concerning a recording date and time on the magnetic tape is allocated to the subsequent eight bytes, and information indicating a copy generation is allocated to the subsequent one byte. Status information concerning an editing point (editing information) is allocated to the subsequent two bytes for every byte, and an audio mode is allocated to the subsequent six bytes. The audio mode here includes a frame size, a sampling frequency, and so on. The subsequent four bytes are reserved, and information concerning the pack unit is allocated to the subsequent 11 bytes. The information concerning the pack unit, here, is reference information for decoding and includes frame numbers, the number of frames, and a presentation time stamp (PTS).

FIG. 15 is a diagram showing a video frame packet when the keyword number is set to a value of 68, among these settings of the keyword number. As described above in the packet structure in FIG. 11, in the video frame packet, a first byte is set to the keyword number having a value of 68 and a number n of subsequent bytes (=92) is allocated to the subsequent one byte. An operation mode for outputting a transport stream is set to the subsequent one byte. A VTR mode, tape position information (ATNF) and various flags (EFL and FLG), and a title time code, which have the same content as those of the corresponding audio frame, are allocated to the subsequent five, three, and five bytes, respectively.

A binary time code is allocated to the subsequent five bytes. Information concerning an original recording date and time is allocated to the subsequent 10 bytes, information concerning a recording date and time on the magnetic tape is allocated to the subsequent eight bytes, and information indicating a copy generation is allocated to the subsequent one byte. In the video frame packet, sub-code data to which the time management information DTS is allocated is allocated without change to the fourth to 39-th bytes. When the corresponding video data is a B picture or a C picture, the data is associated with the corresponding I picture or P picture.

Status information concerning an editing point (editing information) is allocated to the subsequent two bytes for every byte, and a recording mode of search data is allocated to the subsequent one byte. The search data is allocated in association with each search speed, as shown in FIG. 16. Information concerning the pack unit is allocated to the subsequent 11 bytes. The content of an MPEG video stream header is allocated to the information concerning the pack unit here. In the data concerning the pack unit, information indicating an I picture, a P picture, and the like and information indicating the end of recording (V-END) are allocated to information DATA-H concerning pictures, as shown in FIG. 17.

Information concerning a video mode is allocated to the subsequent 16 bytes. Additional information for every frame (extended DV pack) is allocated to the subsequent one byte and subsequent 15 bytes.

FIG. 18 is a diagram showing an ECCTB packet when the keyword number is set to a value of 80. Information recorded on 16 tracks, which form an interleave unit, is allocated to the ECCTB packet that is recorded in the head and a fixed position of the interleave unit, as described above. As described above in the packet structure in FIG. 11, in the ECCTB packet, a first byte is set to the keyword number having a value of 80 and a number n of subsequent bytes (=93) is allocated to the subsequent one byte. Information having the same content as in the sub-code in the first track of interleave is recorded in the subsequent 37 bytes. The information includes tape position information ATNF and various flags (EFL and FLG), an ETN, a title time code TTC, a binary group, information concerning an original recording date and time, information concerning a recording date and time on the magnetic tape, and a copy generation.

Editing information concerning the video is allocated to the subsequent 25 bytes. After a status concerning an editing point, a search data mode, and so on are allocated, information concerning the video data and the audio data (video mode and audio mode) is allocated.

FIG. 19 is a diagram showing the structure of a sink block in the search data. In the sink block, the header of a search sink block is allocated to first 40 bits and the search data is allocated to the remaining 720 bits. In the header here, an X address and a Y address in the coordinate system of a head macroblock, which are recorded in the sink block, are allocated with a reserved one bit sandwiched therebetween. A packet ID (PC ID), a packet header, and packet data are subsequently allocated.

The packet header is set so as to indicate the content of the packet data. As shown in FIG. 20, values from two to seven indicate a variety of displayed information similar to that described above with respect to the keyword number and values from 8 to 11 indicate positional information for a search.

Figures 21, 22:
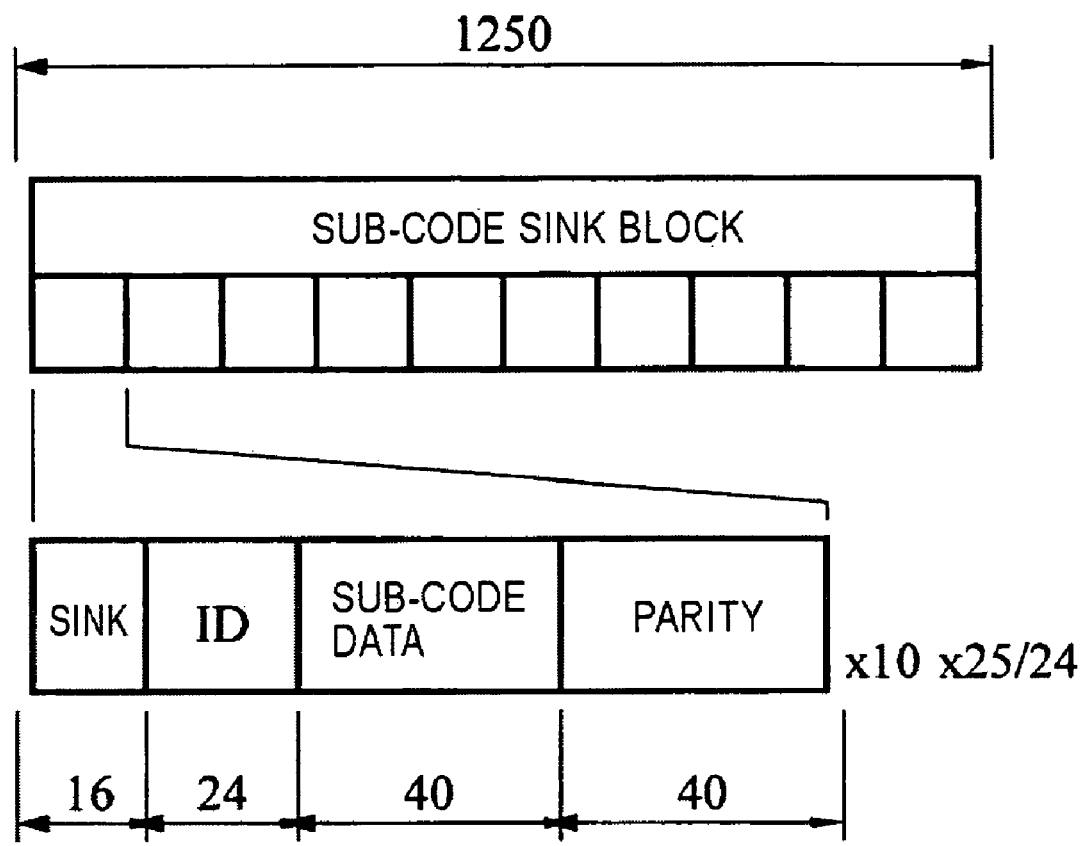
FIG. 21 is a diagram showing the structure of a sub-code sector.
FIG. 22 is a diagram showing the sink in the sub-code sector.

FIG. 21 is a diagram showing the structure of the sub-code sector. The sub-code sector is used for high-speed search at, for example, a speed of about two hundred times. After the 24-to-25 modulation, the entire sub-code sector has 1250 bits that are divided into 10 sub-code sink blocks. In each of the sub-code sink blocks, first 16 bits are allocated to a sink and the subsequent 24 bits are allocated to an ID. The subsequent 40 bits are allocated to sub-code data and the remaining 40 bits are allocated to parity bits.

A predetermined pattern S0 and a pattern S1 formed by inverting the bits of the pattern S0, which are different from the patterns M0 and M1 in the sink in the main sector, are allocated to the sink, as shown in FIG. 22. The main sector can be discriminated from the sub-code sector based on the patterns M0 and M1 and the patterns S0 and S1.

The ID in the sub-code sector includes a first ID0, a second ID1, and a third ID2, as shown in FIG. 23. The first ID0 defines format types (F TYPE) and track pair numbers, as in the sink ID in the main sector. Sub-code sink block numbers (SB numbers) in the sub-code sector are allocated to the second ID1 and part of the second ID1 is reserved. Overwrite protect data is allocated to the third ID2, as in the sink ID in the main sector. When it is determined that the data recorded in the sub-code sector remains as a result of deletion of previous data, the corresponding sink block is processed as an invalid sink block because of the setting of the overwrite protect data.

FIG. 24 is a diagram showing the content of the sub-code data in the sub-code sector. Information shown in FIG. 24 is recorded in the sub-code sector in accordance with the packet structure described above with reference to FIG. 10. As for the sub-code data, the same data is recorded in the tracks in an even-numbered track pair and the same data is recorded in the tracks in an odd-numbered track pair in accordance with the fixed-length data format described above with reference to FIG. 10. However, the sub-code data has a structure different from the packet structure described above with reference to FIG. 10 in the sub-code sink block numbers 0, 4, and 9. Various flags and tape position information (ATNF) are allocated to the sub-codes having the sub-code sink block numbers 0, 4, and 9 in the even-numbered track pair and the odd-numbered track pair.

FIG. 25 is a diagram showing the structure of the sub-code data in the sub-code sink block numbers 0, 4, and 9. In this sub-code data, various flags are recorded in a first byte. FIG. 26 is a diagram showing the settings of the flags. The presence of search data and a phase difference between the sub-code data and the main data are recorded.

In contrast, a blank flag BF indicating track numbers (ATN) with respect to the head of the tape are discontinuous is set in a bit b0 in the second byte. The blank flag BF is set to the same value in the recording since the track numbers have once become discontinuous. A track number (ATN) with respect to the head of the tape is allocated to the third byte. The track number (ATN) is the same as in the DV mode. A first bit in the track number (ATN) is allocated to a code.

Various flags shown in FIG. 27 are set in a last byte. The flags here include an I flag indicating a search point, a P flag that is set when still pictures start to be recorded at a position in the main data, a PF flag indicating that an I picture or a P picture is allocated to the main data, and an EF flag relating to editing.

In contrast, extended track numbers ETN are allocated to the sub-codes having the sub-code sink block numbers 1 an 6 in the even-numbered track pair and to the sub-code having the sub-code sink block number 5 in the odd-numbered track pair (FIG. 24).

FIG. 28 is a diagram showing a sub-code to which an extended track number ETN is allocated. In the sub-code, the corresponding keyword number is allocated to bits from b5 to b0 in a first byte and an extended track number ETN is allocated to the third byte.

In contrast, title time codes TTC are allocated to the sub-codes having the sub-code sink block numbers 2, 5, and 7 in the even-numbered track pair and to the sub-codes having the sub-code sink block number 1 and 6 in the odd-numbered track pair (FIG. 24).

FIG. 29 is a diagram showing a sub-code to which a title time code is allocated. In the sub-code, a keyword number is allocated to bits from b5 to b0 in a first byte and information concerning the time code is sequentially allocated to the subsequent bytes.

In contrast, no information is allocated to the sub-codes having the sub-code sink block numbers 3 and 8 in the even-numbered track pair (FIG. 24). Information concerning recording date and time is allocated to the sub-codes having the sub-code sink block number 2 and 7 in the odd-numbered track pair. Information concerning recording time is allocated to the sub-codes having the sub-code sink block number 3 and 8 in the odd-numbered track pair.

Figure 30:
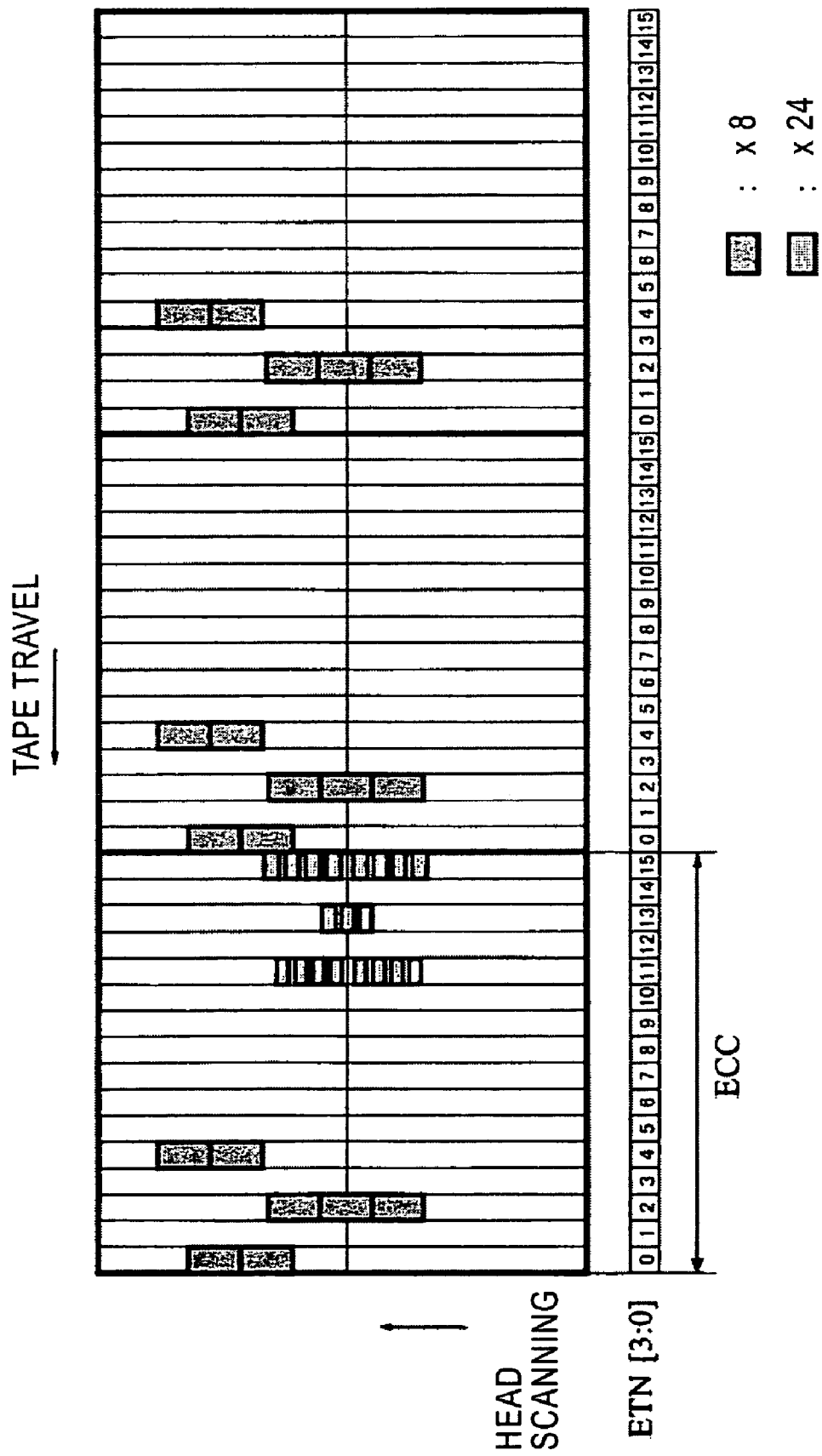
FIG. 30 is a diagram showing an allocation of the search data.

FIG. 30 is a diagram showing an allocation of the search data recorded in the main sector and the sub-code sector on the magnetic tape. Recording positions of the search data are defined based on physical positions after interleave. The search data for 8×speed is allocated at a rate of one per one ECC bank (16 tracks).

Specifically, in the search data for 8×speed, two pieces of the same data corresponding to 17 sink blocks (data numbers from 17 to 33) are repeatedly recorded in the recording tracks having the track numbers ETN[3:0]=0 and 4 in the ECC. Three pieces of data corresponding to the remaining 17 sink blocks (data numbers from 0 to 16) are repeatedly recorded in the recording track having the track number ETN[3:0]=2 in the ECC. Accordingly, 34 sink blocks (data numbers from 0 to 33) are allocated to one ECC bank.

In contrast, one piece of the search data for 24× speed is allocated for every three ECC banks (16×3=48 tracks). The recording positions are indicated by a two-bit ternary counter in a search phase (SPH) in a sub-code flag extension (FLE). In the search data for 24×speed, four pieces of the data corresponding to eight sink blocks (data numbers from 0 to 3 and from 8 to 11) are repeatedly recorded in the recording tracks having the track numbers ETN[3:0]=11 and 15 in the ECC. Three pieces of data corresponding to the four sink blocks (data numbers from 4 to 7) are repeatedly recorded in the recording track having the track number ETN[3:0]=13 in the ECC. Accordingly, the data corresponding to 12 sink blocks is repeatedly recorded in three ECC blocks.

The search data is searched and used based on, for example, TTCs for display in the sub-codes, described above with reference to FIG. 20.

Figure 31:
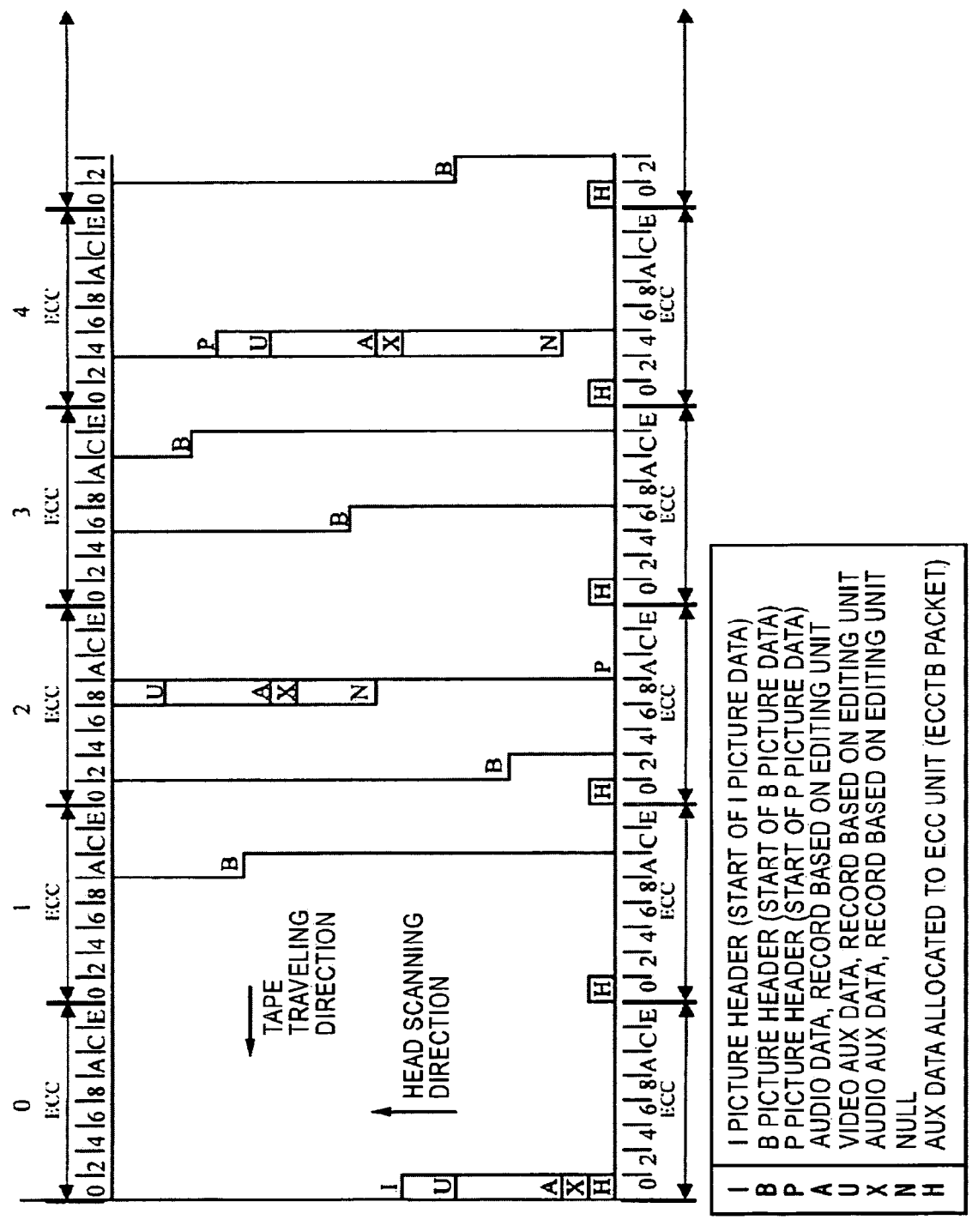
FIG. 31 is a diagram showing a recorded image of the main data.

FIG. 31 is a diagram showing a recorded image of the main data recorded in the main sector and the sub-code sector on the magnetic tape. In this embodiment, the video data and audio data compressed in an MPEG format including MP@HL and MP@H-14 are recorded. The video data is divided based on I pictures and P pictures in a GOP relating to data compression to be blocked, and the video data in each block, the corresponding audio data, and the corresponding auxiliary data are combined to form a pack unit. In the example shown in FIG. 31, reference letters I, P and B denote an I picture, a P picture, and a B picture, respectively. Subsequent to a first I picture, pictures B, B, P, B, B, P . . . are sequentially allocated, and the ratio of I, B, B, P pictures is represented by 4:1:1:2. Referring to FIG. 31, for every ECC unit, which is an interleave unit, top and bottom figures denote ECC block numbers and alphanumeric characters inside the ECC block numbers denote track numbers in the ECC unit.

At a first track in a first sink block for every ECC unit on the magnetic tape, the auxiliary data is recorded in ECC packets (shown by reference letter H). In each pack unit, the audio data (shown by reference letter A) is recorded after the auxiliary data concerning the audio data (shown by reference letter X) is recorded, and the auxiliary data concerning the video data (shown by reference letter U) is then recorded. Subsequently, each picture is recorded in the order of streaming. When the audio data is 384 [Kbps], the audio data is allocated in 50 sink blocks on the average.

The pack units are continuously recorded with the sink block having the NULL data and the main data sandwiched therebetween, as required, in order to ensure an appropriate delay time. Accordingly, in this embodiment, the head of each of the pack units is recorded at a predetermined position determined based on the time management information DTS in the decoding.

Specifically, in this embodiment, the NULL data is recorded in the head of each of the pack units such that the corresponding time management information DTS on the magnetic tape is preceded by a number greater than the number of tracks given by adding a preceding amount α corresponding to a predetermined number of tracks to a video buffering verifier (vbv) delay in the decoding. The end position of each of the pack units is set so as to surely precede the corresponding time management information DTS on the magnetic tape. The preceding amount α is 16 tracks here.

Figure 32:
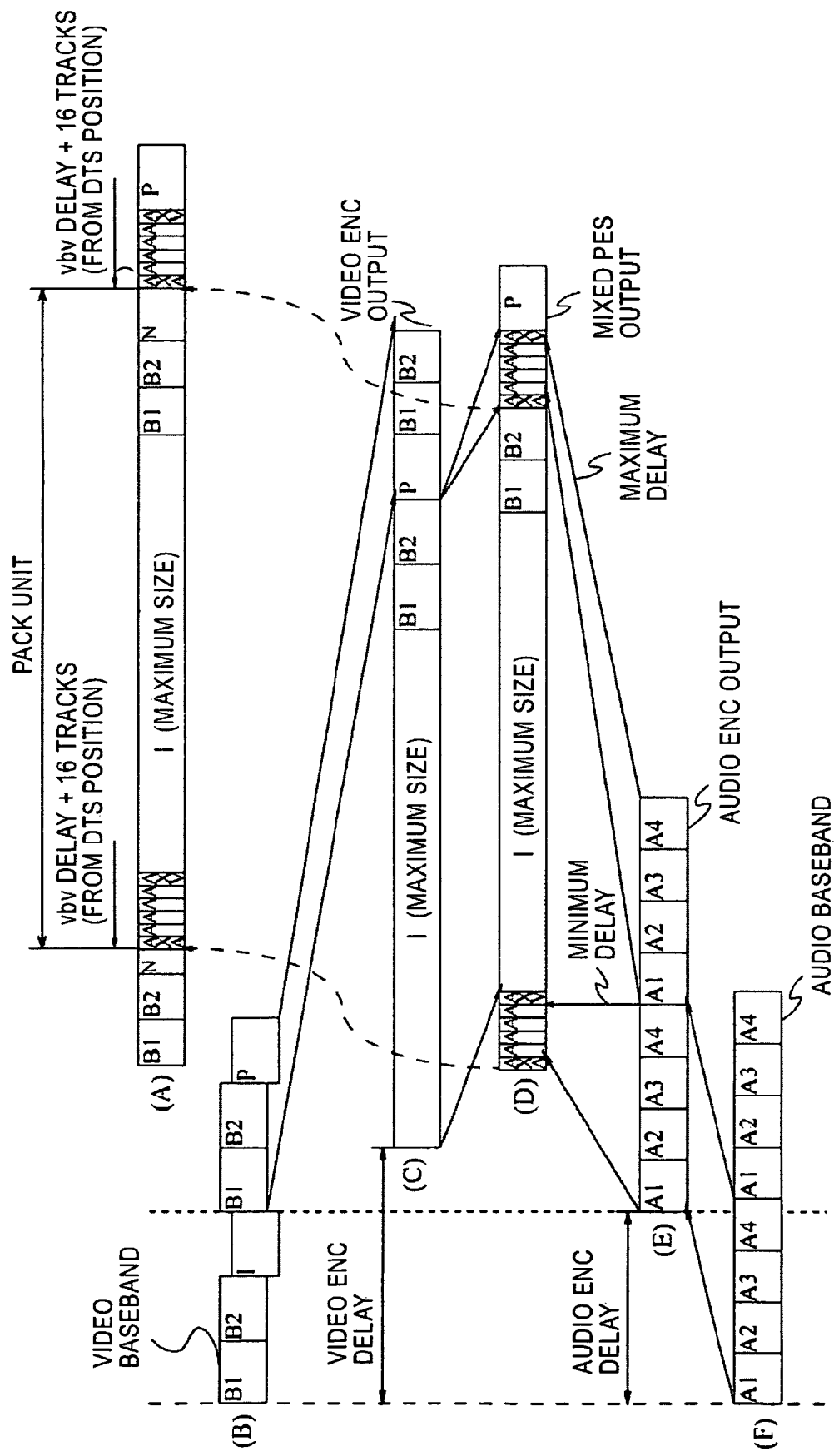
FIG. 32 includes diagrams illustrating the process of the main data.

As shown in FIG. 32, in this embodiment, the video data input in a baseband (FIG. 32(B)) is compressed in the MPEG format (FIG. 32(C)) to produce a video ENC delay caused by encoding the video data. A case in which continuous pictures are encoded into B, B, I, B, B, and P pictures is shown in FIG. 32(B). In contrast, the corresponding audio data A1 to A4 (FIG. 32(F)) is compressed (FIG. 32(E)) to produce an audio ENC delay caused by encoding the audio data. The audio data A1 to A4 here represents each frame having a length of 24 [msec], which is a data compression unit of the audio data. Reference letters AXA and AXV denote the auxiliary data of the audio data and the auxiliary data of the video data, respectively.

The compressed video data and audio data form a pack unit along with the corresponding auxiliary data. The pack unit is subjected to time-division multiplexing (FIG. 32(D)) and is recorded on the magnetic tape (FIG. 32(A)). In the recording on the magnetic tape, in the audio data Al to A4, the delay time in the trail audio data A4, which forms a pack unit along with the I pictures, is a minimum delay time on the magnetic tape, whereas the delay time in the audio data A1 allocated at the head of the pack unit subsequent to the pack unit including the I picture is a maximum delay time on the magnetic tape. It is understood that the video buffering verifier (vbv) delay in the decoding is varied due to the amount of codes generated in the compression of the data, a variety of auxiliary data, insertion of the search data, or the like.

Figure 33:
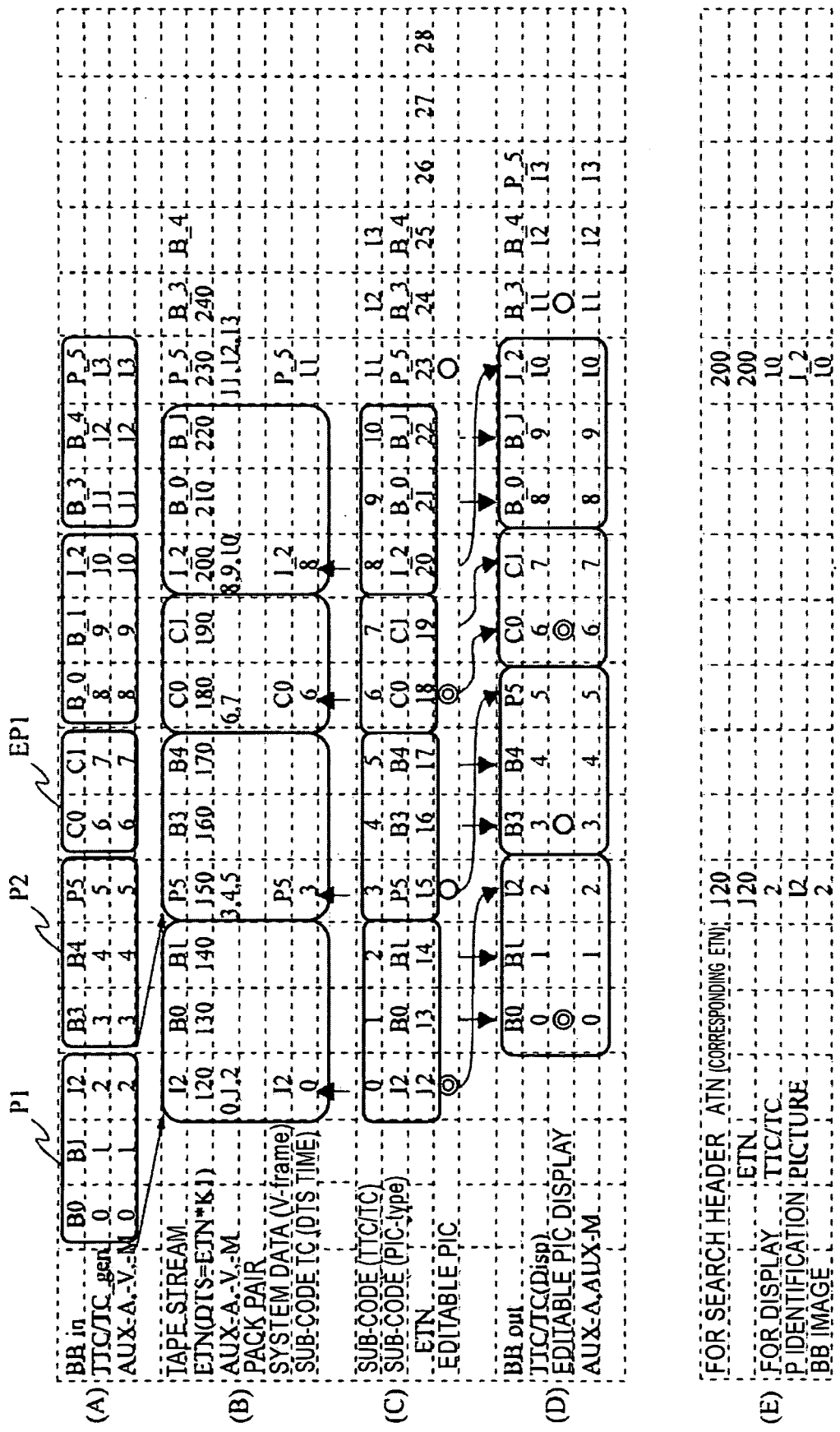
FIG. 33 includes diagrams showing the relationship with packing in a pack unit.

FIG. 33 includes diagrams showing the relationship with packing in each pack unit. An example in which the recording is started from the first I picture in the video data input in the baseband is shown in FIG. 33 (A). In the baseband input, the I, B, and B pictures, the corresponding audio data, and the corresponding auxiliary data form a pack unit P1. As the auxiliary data here, the auxiliary data AUX-A of the audio data, the auxiliary data AUX-V of the video data, and so on are provided. In addition, the title time code TTC and the like are generated and are allocated to the auxiliary data.

Figure 34:
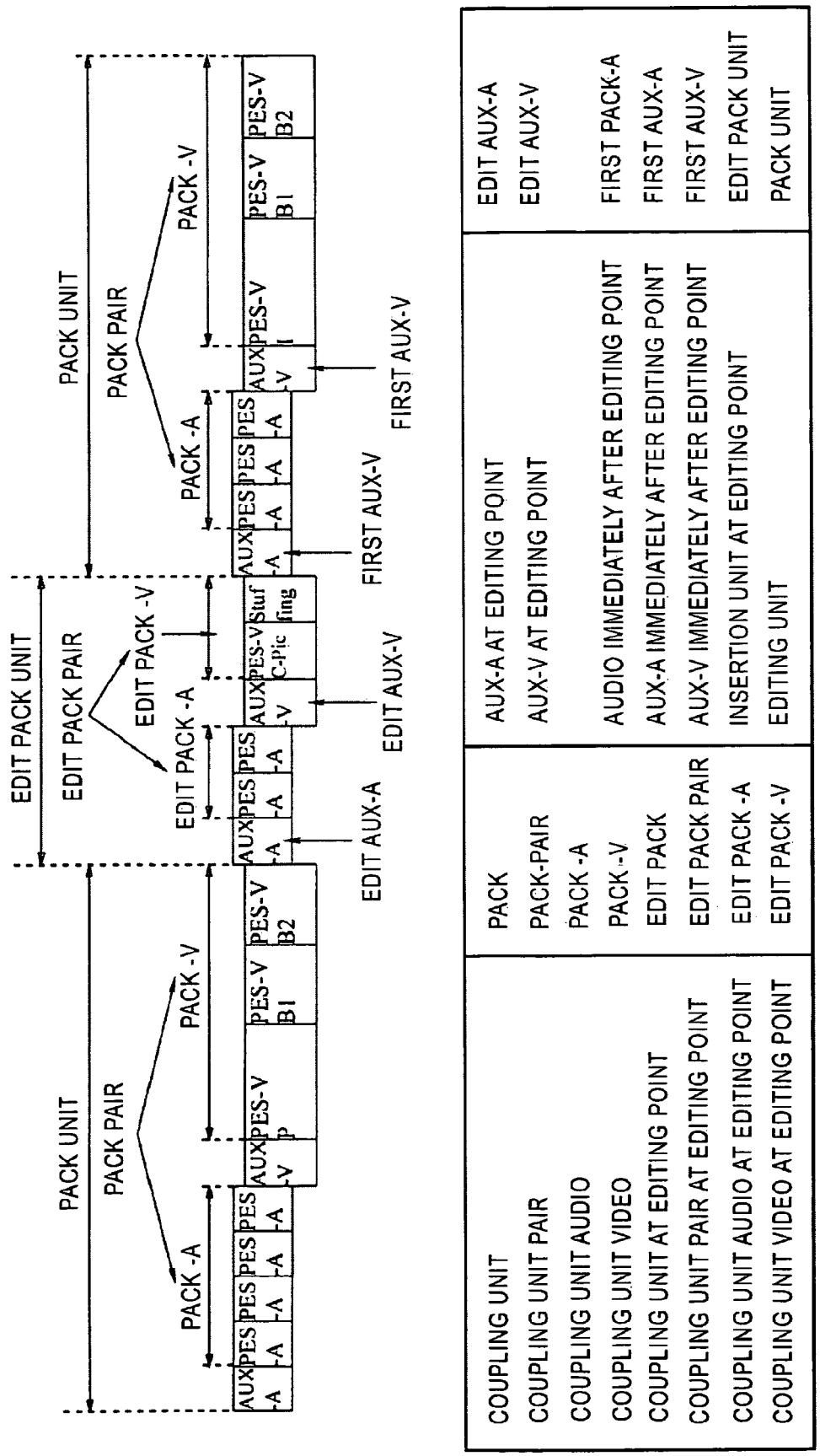
FIG. 34 shows the relationship of a series of data relating to the pack unit.

A pack unit EP1 including C0 and C1, which is an editing pack unit at an editing point, is inserted for matching with the vbv delay required for editing. FIG. 34 shows the relationship of a series of data relating to these pack units.

As shown by arrows (FIG. 33(A)), according to this embodiment, the data stream input in the baseband is multiplexed (FIG. 33(B)), the main data is recorded in each pack unit on the magnetic tape, and the corresponding auxiliary data is recorded in the sub-codes on the magnetic tape (FIG. 33(C)). The stream of the main data is recorded at a preceding position with respect to the time management information DTS of the sub-code that is recorded at a position determined by the corresponding time management information DTS. The search data is recorded from an ECC bank subsequent to the corresponding I picture and the corresponding time management information DTS. While the video data is reallocated by reordering during encoding, the audio data and the auxiliary data are recorded on the magnetic tape in the order of input.

The extended track number ETN of the head of the I picture is 120 in order to provide a positive value at the head of the stream. The same applies to the track number (ATN). Incidentally, when the recording is started with the extended track number ETN and the track number (ATN) being set to a value of zero, the time management information DTS on the magnetic tape corresponding to a time given by adding the video buffering verifier (vbv) delay in the decoding to a time period corresponding to an ECC block is 30 to 100 tracks. However, in self-encoding, in consideration of using a common extended track number ETN and a common track number (ATN) in a system having a field frequency of 59.94 [Hz] and a system having a field frequency of 50 [Hz], a value of 120 having the same least common multiple of the number of frames and tracks in these systems is set as first values of the extended track number ETN and the track number (ATN).

According to this embodiment, the video data and the audio data is reproduced and decoded in this manner described above on the basis of each auxiliary data in the sub-code sector recoded on the magnetic tape (FIG. 33(D)). The search data (FIG. 33(E)) is generated with the I picture of the corresponding video data, and is recorded from an ECC bank subsequent to the corresponding I picture and the corresponding time management information DTS, as described above.

Figure 35:
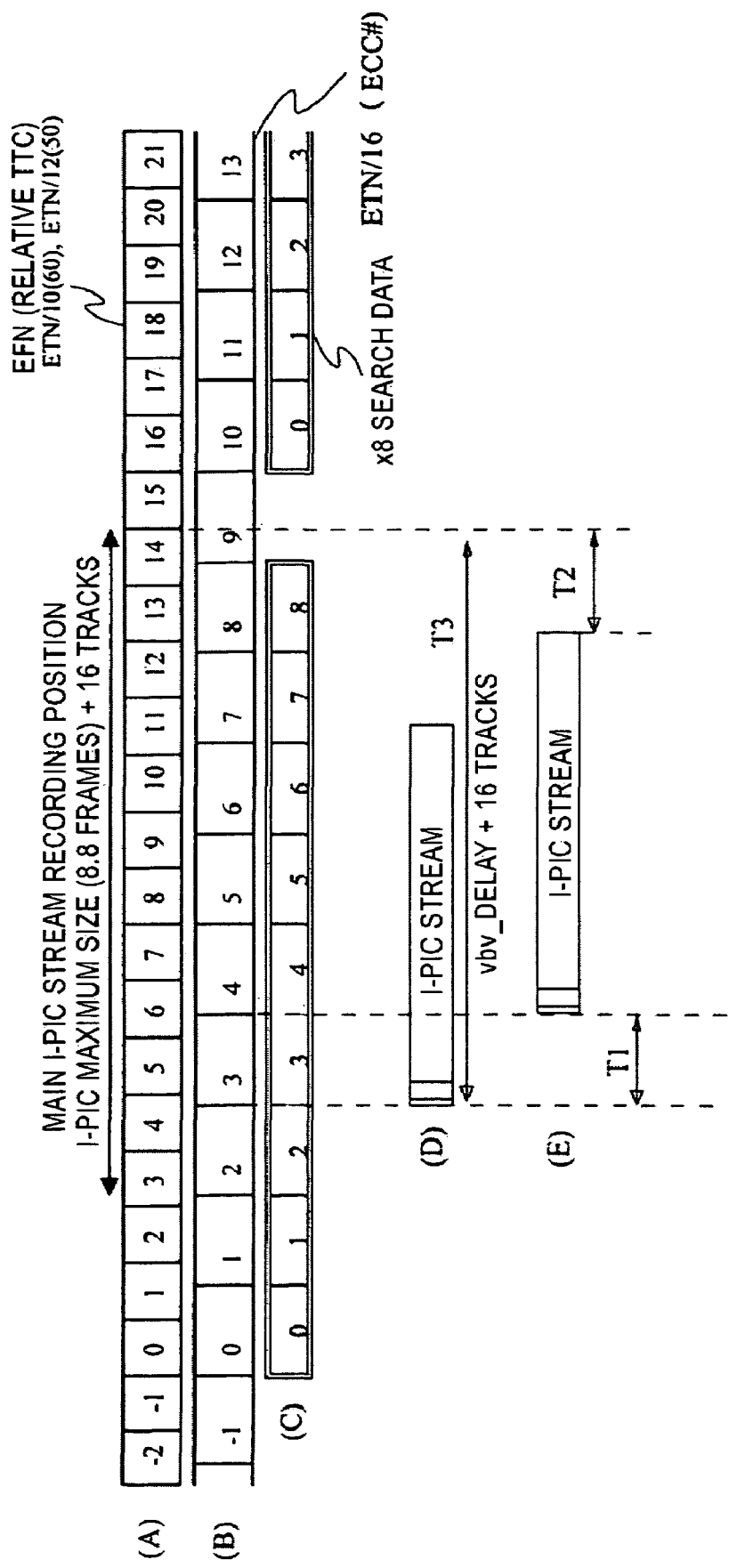
FIG. 35 includes diagrams illustrating the relationship between the main data and the sub-code data.

On the magnetic tape, the main data has a relationship shown in FIG. 35 with the sub-code data. FIG. 35 illustrates the relationship of the recording position between the sub-code and the head of the corresponding pack unit with respect to the first frame of the pack unit. For a system having a field frequency of 59.95 [Hz], the sub-code is formed in units of 10 tracks in one frame. The same content is repeatedly recorded in the sub-code data corresponding to 10 tracks in the frame in the structure described above with reference to FIG. 24.

The main data is set so as to precede the extended track number ETN of the sub-code, which is the DTS on the magnetic tape, by a time given by adding a preceding amount corresponding to a predetermined number of tracks to the vbv delay in the decoding and such that the trail of the pack unit does not exceed the position determined by the time management information DTS. However, a shift in the position where the recording of the pack unit is started is allowed, as shown in FIGS. 35(D) to 35(E).

A shift T1 at the starting position, which is varied due to insertion of the auxiliary data and the search data, can be estimated in a manner described below. In this case, delaying the entire reproduction process allows the data in each pack unit to be decoded after the time determined by the time management information DTS. However, this delay only shifts the reference time backward and an additional delay is required for the data to be recorded in the sub-code, thus complicating the process.

Among elements that vary the shift T1 at the starting position, a maximum shift caused by the density of the search data is 1.6 tracks both at 8× and 24× speeds, as described above. The amount of the corresponding audio data is 0.7 tracks and that of the auxiliary data is three tracks/three frames. The amount of the NULL data is 1.0 track when the position where the pack unit starts to be recorded is postponed in units of tracks. A total of the amount of data is 6.3 tracks.

Hence, according to this embodiment, the preceding amount α corresponding to a predetermined number of tracks should be set to 6.3 or more, thereby permitting continuous reproduction in video and audio streams. In consideration of further expandability, this preceding amount α is set to 16 tracks according to the format convention.

Specifically, when the preceding amount α is set to 9 to 12 tracks, which is larger than 6.3 tracks, an additional margin allows the auxiliary data (AUX-M) to be collectively recorded. In this case, it is possible to intermittently record the data of around 100 [KB] corresponding to 10 tracks. It is also possible to record additional search data for 4× speed, 16× speed, or the like, in addition to the search data for the 8× speed and the 24× speed. Recording such additional search data reduces the rate of the video data by an amount corresponding to the additional search data. In a system using a common memory in the recording and reproduction, a margin corresponding to a few frames is left in the reproduction, thus utilizing this margin in various processes. In other words, setting the maximum preceding amount in the recording to four tracks allows, in the reproduction side, the compliance to the extended format described above, and allows the amount of memory corresponding to 16 tracks to be ensured. In this case, it is possible to save the amount of memory by an amount corresponding to one frame, compared with a case where an additional system is structured.

FIGS. 35(A), 35(B), and 35(C) show the main data, the sub-code data, and the search data, respectively. FIG. 35(D) shows an example of recording in a maximum preceding amount and FIG. 35(E) shows an example of recording after a maximum delay. Referring to FIGS. 35(A) to (E), a vbv delay of one second corresponds to 300 tracks. Accordingly, in this embodiment, a margin of a period T2 is left both between the trail of the pack unit and the corresponding DTS and between the trail of the I picture and the corresponding DTS.

Figure 36:
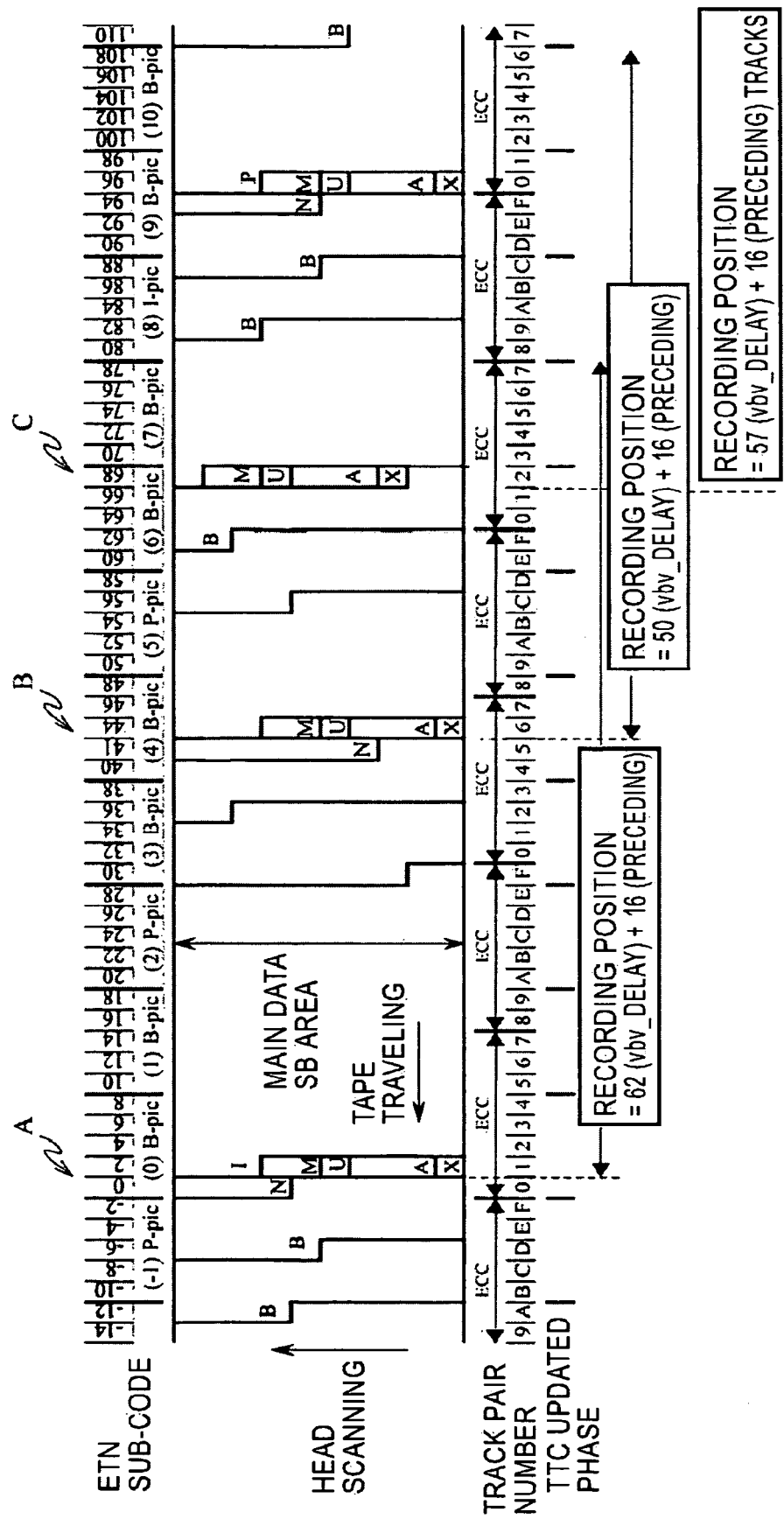
FIG. 36 is a diagram illustrating the recording in the pack unit.

In the process of setting the head of the pack unit, as shown by a reference letter A in FIG. 36 in contradistinction to FIG. 31, when the vbv delay in the decoding is converted into 62.7 tracks, adding 16, which is the number of tracks for interleave, to 62 given by truncating the fractions after the decimal point of 62.7 produces 78 tracks. Accordingly, when the extended track number ETN, which is a position on the magnetic tape determined by the time management information DTS, is a value of 80, the NULL data is allocated such that the corresponding pack unit is recorded from a position having a extended track number ETN of two, which precedes the position of the extended track number ETN by 78 tracks. Referring to FIG. 36, 10 tracks correspond to the period of one frame and the ECCTB packets are not shown here.

At the head of the pack unit shown by reference letter B, the vbv delay in the decoding is converted into 50.4 tracks. In this case, the number of tracks calculated in the same manner described above is 66. The number of tracks shifts by 30 tracks, compared with the case shown by the reference letter A, and the ETN is 110. The NULL data is allocated such that the corresponding pack unit is recorded from a position at which ETN=44. The value 44 is given by subtracting the value 66 from ETN=110.

At the head of the pack unit shown by reference letter C, the vbv delay in the decoding is converted into 57 tracks. In this case, the number of tracks calculated in the same manner described above is 73. Since the ETN has a value of 140, subtracting a value of 73 from 140 gives the ETN=67. In this case, the ETN has a value of 68 even without insertion of the NULL data. Since the position has already exceeded the starting position of recording, the pack unit is recorded without allocating the NULL data.

The reason why the continuous pack units are delayed from the starting position of recording having the maximum preceding amount and there is no need to insert the NULL data is that the amount of codes generated by data compression is small in the three pictures constituting the pack unit. The same situations occur when multiple factors, including a case where the amount of the AUX data is large in the pack units, a case where a delay (a maximum of one track) occurs due to insertion of the NULL data, and a case where the search data is recorded during the delay time, are simultaneously caused.

(1-2) Video Tape Recorder

Figure 37:
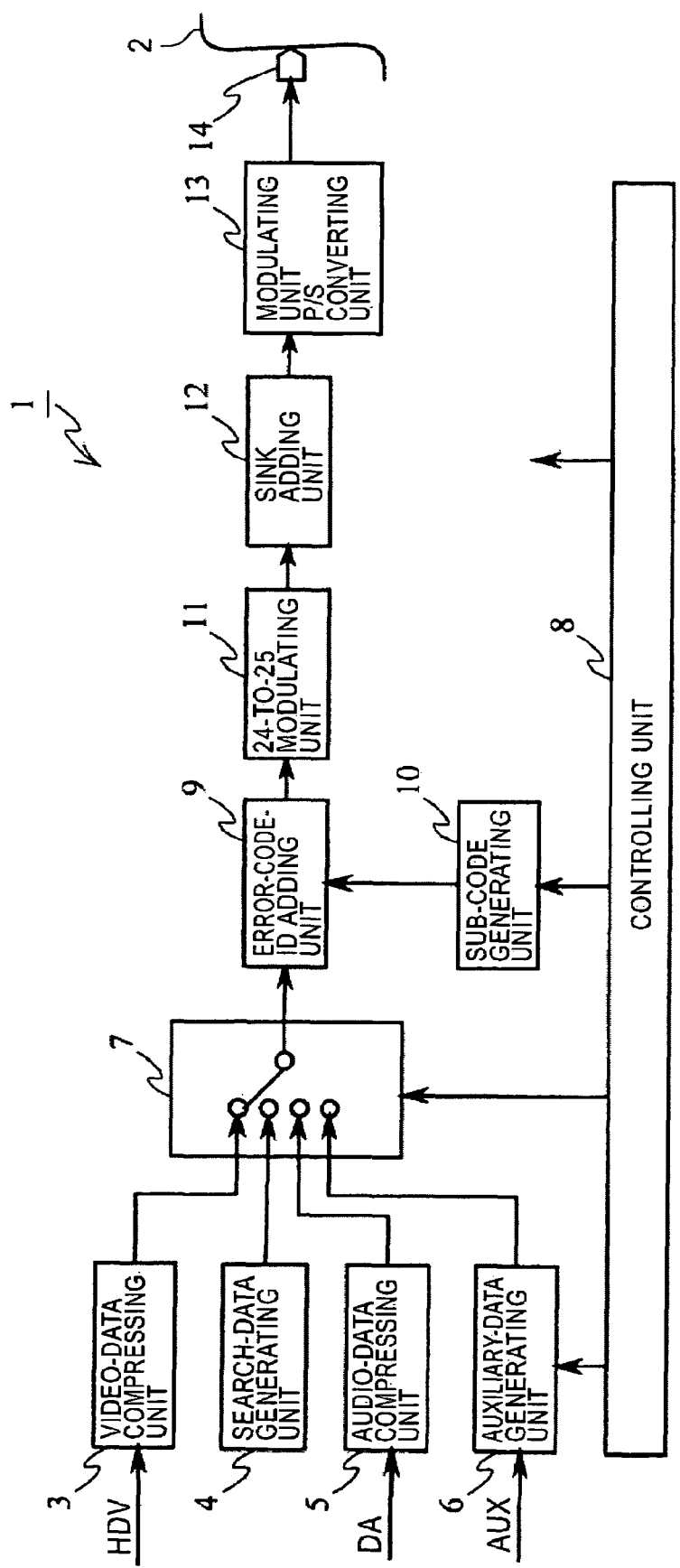
FIG. 37 is a block diagram showing the structure of a recording system.
Figure 38:
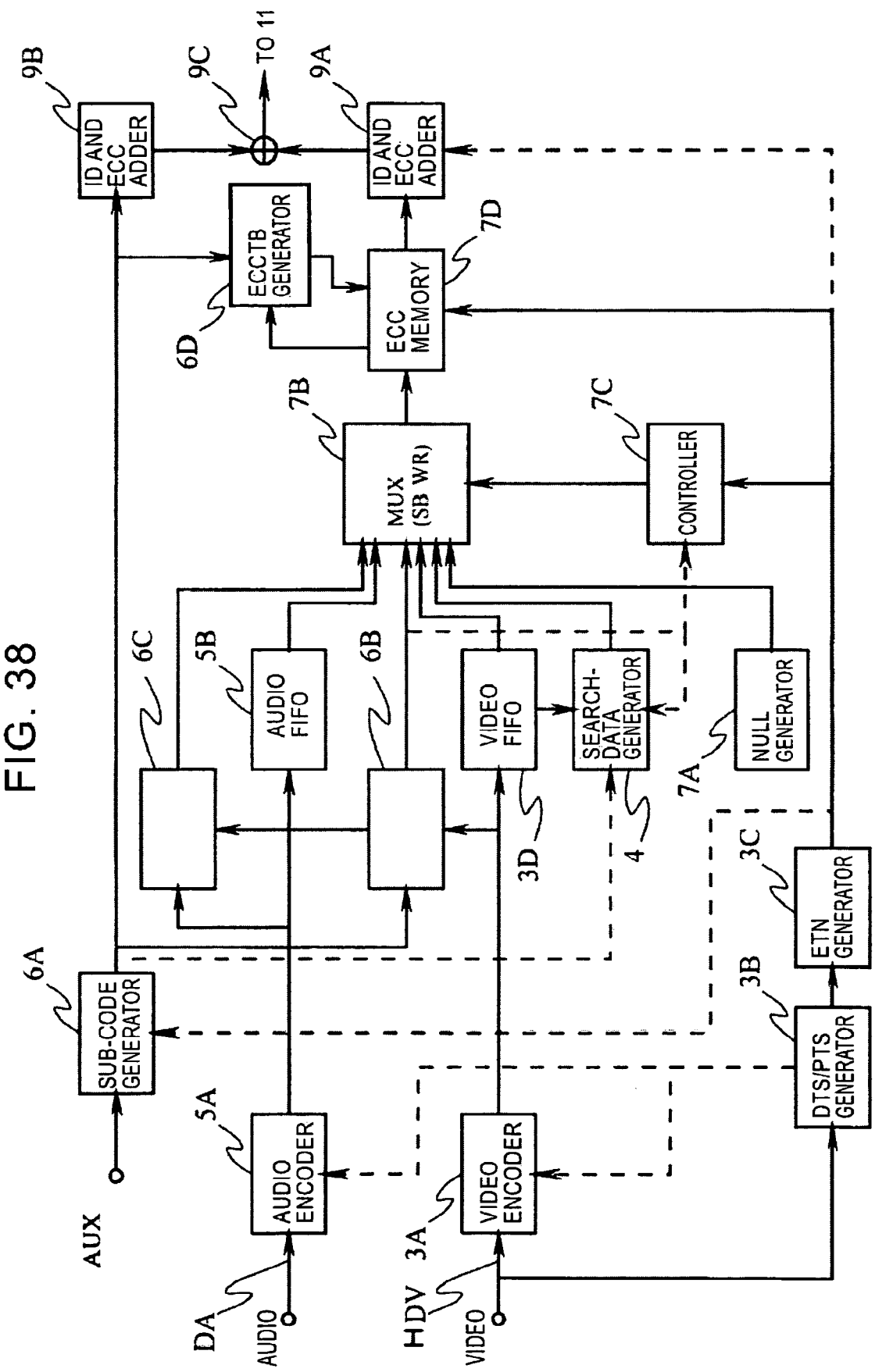
FIG. 38 is a block diagram showing part of the structure in FIG. 37 in detail.

FIG. 37 is a block diagram showing the recording system in a video tape recorder according to an embodiment of the present invention. FIG. 38 is a block diagram showing part of the recoding system in detail. In a video tape recorder 1, video data and audio data are compressed in the format, described above with reference to FIGS. 1 to 36, in the MPEG, MP@HL, MP@14, or another format and recorded on a magnetic tape 2 and/or the compressed and recorded video data and audio data are reproduced and decoded.

Specifically, in the video tape recorder 1, a video-data compressing unit 3 compresses video data HDV sequentially input in a format conforming to MPEG2 (MP@HL or HM@14) under the rate control by a controlling unit 8 and outputs the compressed data along with a variety of time information and so on. Specifically, the video-data compressing unit 3 includes a video encoder 3A, a DTS/PTS generator (DTS/PTS GEN) 3B, an ETN generator (ETN GEN) 3C, and a video FIFO 3D (FIG. 38). The video encoder 3A compresses the video data HDV and outputs the video data as a PES signal having a header, a time stamp, and the like added thereto. The DTS/PTS generator 3B detects time information from the video data HDV and outputs time management information DTS and a PTS based on this time information. The ETN generator 3C calculates and outputs an extended track number ETN based on the result output from the DTS/PTS generator 3B according to the relational expression described above. The video FIFO 3D temporarily stores the video data output from the video encoder 3A and outputs the stored video data. According to this embodiment, 15 pictures form one GOP and one P picture is set for every three pictures subsequent to a first I picture in the GOP. B pictures are set in the remaining pictures in the GOP.

A search-data generating unit 4 generates search data and outputs the generated search data by selecting an I picture from the video data and selecting data of a low-frequency component from the encoded data of the I picture.

An audio-data compressing unit 5 receives audio data DA corresponding to the video data HDV, compresses the audio data DA in a format conforming to MPEG Layer2, and outputs the compressed audio data at a rate from 256 to 384 [Kbps]. Specifically, in the audio-data compressing unit 5, an audio encoder 5A compresses the audio data DA and outputs the compressed audio data, and an audio FIFO 5B temporarily stores the data output from the audio encoder 5A and outputs the stored audio data.

An auxiliary-data generating unit 6 generates auxiliary data and outputs the generated auxiliary data. Specifically, the auxiliary-data generating unit 6 includes a sub-code generator 6A, an auxiliary-data generator for video 6B, and an auxiliary-data generator for audio 6C. The sub-code generator 6A generates the corresponding auxiliary data based on a variety information input along with the video data HDV and the audio data DA and outputs the generated auxiliary data. The auxiliary-data generator for video 6B generates auxiliary data of the compressed video data output from the video encoder 3A and outputs the generated auxiliary data. The auxiliary-data generator for audio 6C generates auxiliary data of the compressed audio data output from the audio encoder 5A and outputs the generated auxiliary data. An ECCTB generator (ECCTB GEN) 6D generates auxiliary data required for an ECCTB packet and outputs the generated auxiliary data.

A multiplexing unit 7 multiplexes the compressed video data, audio data, search data, and auxiliary data along with NULL data and outputs the multiplexed data. Specifically, in the multiplexing unit 7, a NULL generator (NULL GEN) 7A generates, for example, NULL data in which all the bits are set to a predetermined logical value and outputs the generated NULL data, and a multiplexer (MUX) 7B sequentially multiplexes the NULL data, the video data and audio data output from the FIFOs SB and 6B, and the search data and auxiliary data output from the search-data generating unit 4 and the auxiliary-data generator 6C under the control of a controller 7C and outputs the multiplexed data. Accordingly, the video tape recorder 1 is structured so as to generate a data stream constituting a sink block.

In the processing described above, the controller 7C calculates the amount of the auxiliary data, search data, and the like for every pack unit, and controls the operation of the multiplexer 7B such that the NULL data is inserted in accordance with the vbv delay in the decoding described above. An ECC memory 7D temporarily stores the data output from the multiplexer 7B for every ECC block and outputs the stored data in a predetermined order to perform interleave process. In this processing, the data output from the ECCTB generator 6D, the data output from the ETN generator 3C, and the like are inserted and output at timings at which the ECCTB packet and the sub-code sector are allocated.

A sub-code generating unit 10 generates a sub-code data stream in the sub-code sector and outputs the generated data stream. An error-code-ID adding unit 9 adds an error correcting code, an ID, and so on to the data output from the multiplexing unit 7 and the data output from the sub-code generating unit 10 to produce data streams in the main sector and the sub-code sector. Specifically, the sub-code generating unit 10 includes the ETN generator 3C, the sub-code generator 6A, and so on described above. In the error-code-ID adding unit 9, an ID and ECC adder 9A adds the ID and the error correcting code to the data output from the ECC memory 7D and outputs the added data. An ID and ECC adder 9B adds the ID and the error correcting code to the data output from the sub-code generator 6A and outputs the added data. An adder 9C collects the data output from the ID and ECC adders 9A and 9B into one line and outputs the collected data to a 24-to-25 modulating unit 11.

The 24-to-25 modulating unit 11 performs 24-to-25 modulation for the data output from the error-correcting-code ID adding unit 9 and outputs the modulated data. A sink adding unit 12 adds a sink to the data output from the 24-to-25 modulating unit 11 and outputs the added data. A modulating unit and P/S converting unit 13 performs NRZI (non return to zero inverted) modulation for the data output from the sink adding unit 12 to convert the modulated data into a serial data stream and drives the magnetic head 14 mounted on a rotating drum based on the serial data stream. The controlling unit 8 is a controller for controlling the operation of each circuit block. The video tape recorder 1 having the structure described above sequentially records the video data, the audio data, and so on on the magnetic tape 2 in the format described above.

In the structure described above according to this embodiment, the multiplexer 7B serves as pack-unit generating means for blocking the video data in units of predetermined blocks to generate a pack unit including a combination of the video data in the blocks, the corresponding audio data, the relating auxiliary data, and the search data. The ETN generator 3C serves as management-information generating means for generating management information ETN, serving as a reproduction reference when the video data is reproduced from the magnetic tape, from time management information DTS when the video data is decompressed and output. The multiplexer 7B and the NULL generator 7A serve as delay means for delaying the data output from the pack-unit generating means by inserting sink blocks including NULL data between the multiplexer 7B and NULL generator 7A and the respective preceding adjacent pack units to delay the pack unit. The circuit blocks downstream of the multiplexer 7B serve as a recording system for recording the data output from the pack-unit generating means on the magnetic tape along with the management information ETN. The controller 7C serves as controlling means for varying a delay time generated in the delay means.

According to this embodiment, the delay time generated in the delay means is varied such that a first recording position of each pack unit is set to a position having a predetermined relationship with the recording position determined by the management information ETN serving as the corresponding reproduction reference, based on the settings of the amount of delay in the delay means. The head of each pack unit, which is the position having the predetermined relationship, precedes the recording position determined by the management information ETN serving as the reproduction reference corresponding to the time management information DTS in a decoder for decompressing the video data and outputting the decompressed data by an amount given by adding a predetermined preceding amount α to the vbv delay in the decoding at the head of the pack unit. The preceding amount α is at least a value corresponding to an average amount of data other than the video data in the pack unit.

Figure 39:
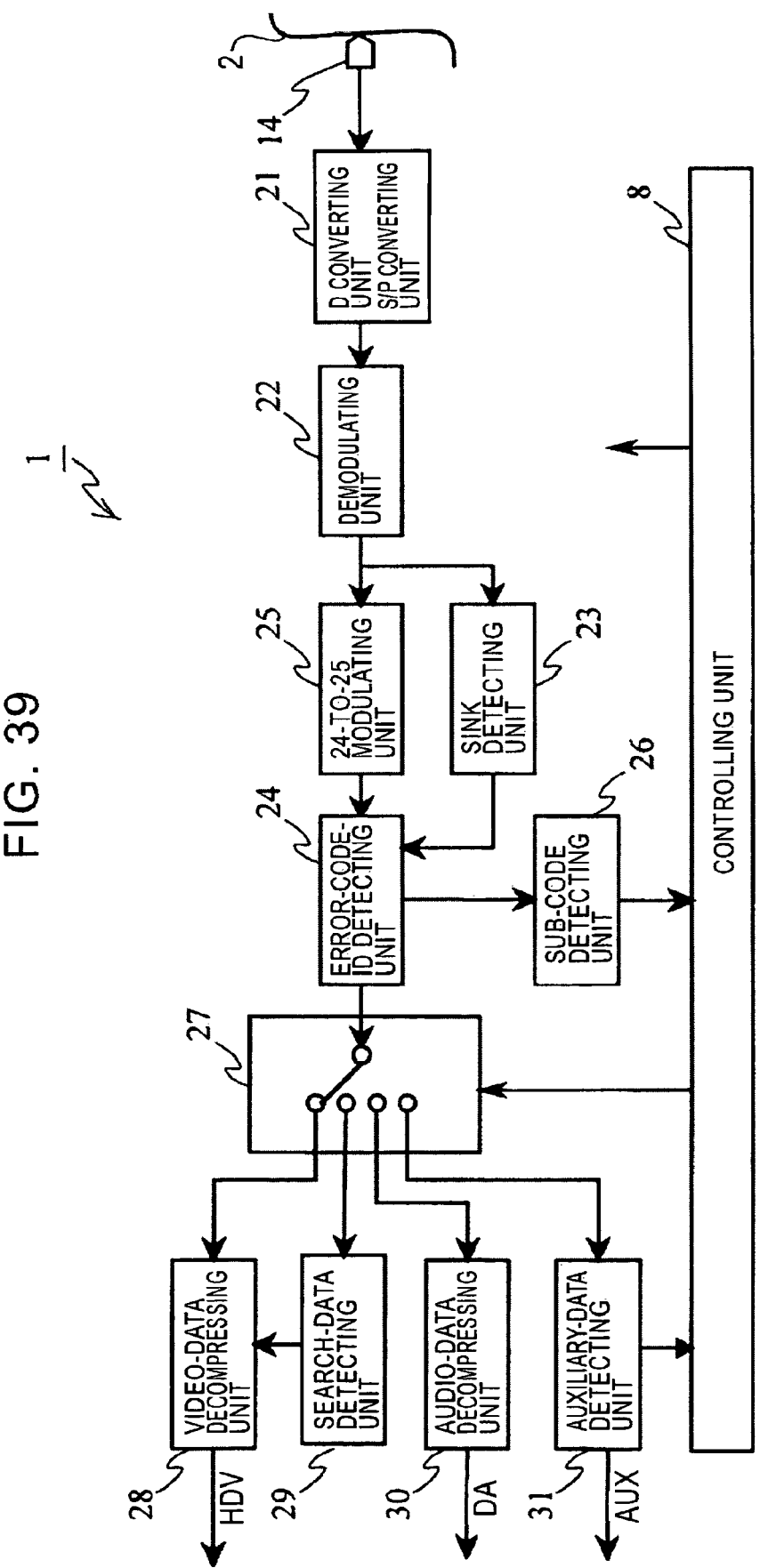
FIG. 39 is a block diagram showing the structure of a reproduction system.
Figure 40:
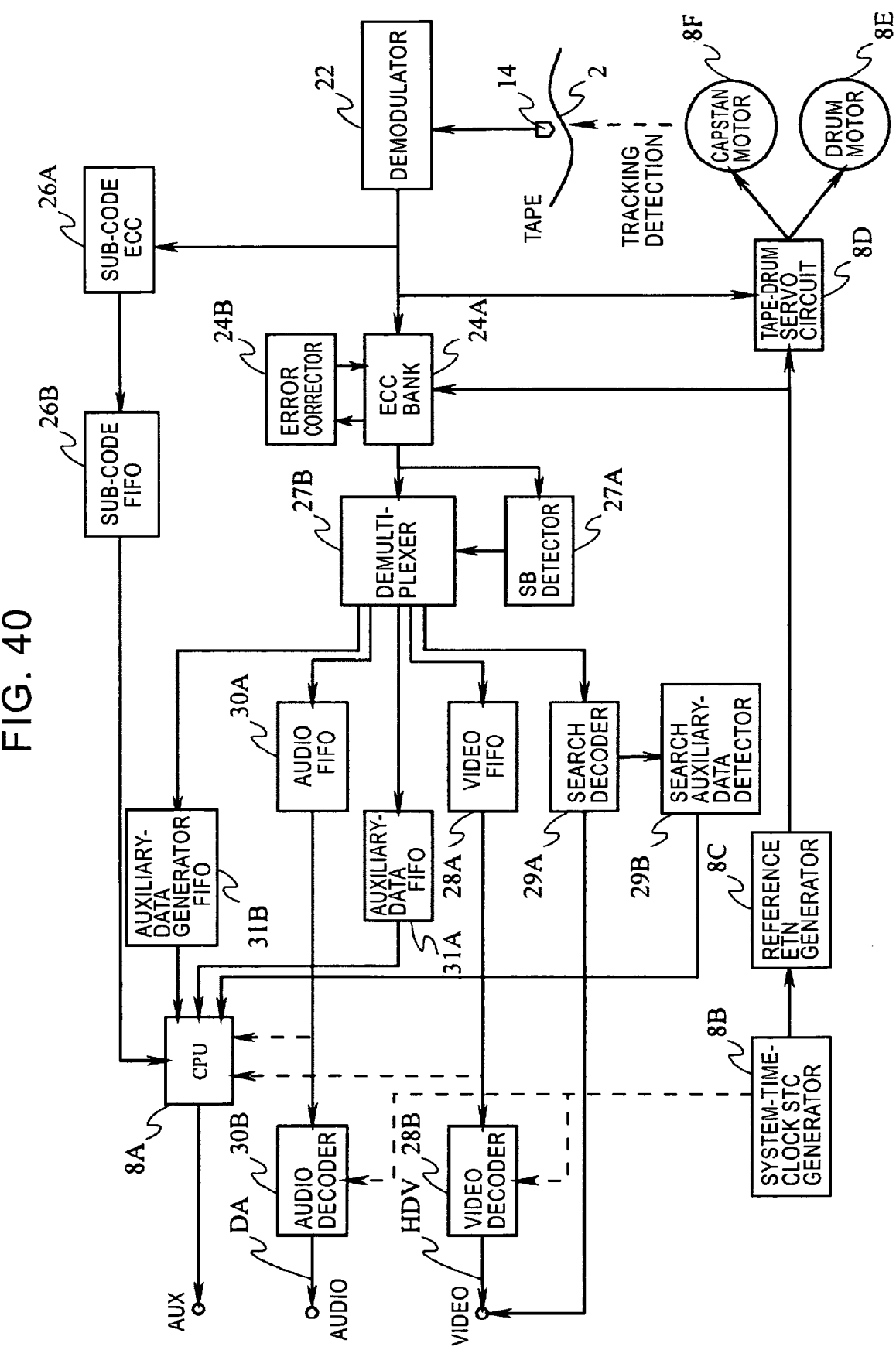
FIG. 40 is a block diagram showing part of the structure in FIG. 39 in detail.

FIG. 39 is a block diagram showing the reproduction system of the video tape recorder 1. FIG. 40 is a block diagram showing part of the reproduction system in detail. In this reproduction system, a digital converting unit and S/P converting unit 21 amplifies a signal output from the magnetic head 14 by an amplifier (not shown) and then performs an analog-to-digital conversion process, for example, performs Viterbi decoding, to reproduce the data input in the modulating unit and P/S converting unit 13 in the recording system. The digital converting unit and S/P converting unit 21 converts the data reproduced into parallel data and outputs the parallel data.

A demodulating unit 22 performs a process corresponding to the NRZI modulation during the recording to demodulate the data output from the digital converting unit and S/P converting unit 21 and outputs the demodulated data. A sink detecting unit 23 detects a sink in each sink block based on the data output from the demodulating unit 22 and notifies an error-correcting ID detecting unit 24 and so on of a timing of the detection of the sink. A 25-to-24 converting unit 25 reproduces the data input in the 24-to-25 modulating unit 11 in the recording system by performing 25-to-24 conversion for the data output from the digital converting unit and S/P converting unit 21 and outputs the data reproduced.

The error-correcting ID detecting unit 24 pastes the SB number and the track number, detected from the ID, of the data subsequent to the ID in the data output from the 24-to-25 modulating unit 11 in an ECC bank 24A based on the timing of the detection of the sink notified by the sink detecting unit 23, performs the error correction process and the interleave process in an error corrector 24B, and outputs the processed data. Specifically, the ECC bank 24A has three banks including a bank for writing the input data, a bank for performing the ECC process in the error corrector 24B, and a bank for outputting the data to a separating circuit 27.

A sub-code detecting unit 26 detects a sub-code sink block from the sub-code sink, performs the error correction, and outputs the processed data. Specifically, in the sub-code detecting unit 26, a sub-code ECC 26A acquires the sub-code data by selectively acquiring the data of the sub-code sector from the data output from the 24-to-25 modulating unit 11 and performing the error correction process and outputs the acquired data, and a sub-code FIFO 26B outputs the sub-code data to a central processing unit (CPU) 8A, which corresponds to the controlling unit 8.

The separating circuit 27 separates the data output from the error-correcting ID detecting unit 24 into processing units based on the SB header and outputs the separated data. In the separating circuit 27, a SB detector 27A detects each SB header to detect the main data in each sink block, and a demultiplexer 27B outputs the data output from the error-correcting ID detecting unit 24 to the processing units based on the detection result in the SB detector 27A.

A video-data decompressing unit 28 receives the video data from the separating circuit 27, and decompresses and outputs the video data, in contrast to the time of the recording. In the video-data decompressing unit 28, a video FIFO 28A temporarily stores the data output from the separating circuit 27 and outputs the stored data, and a video decoder 28B decompresses the data output from the video FIFO 28A and outputs the decompressed data. The video tape recorder 1 can output the video data HDV, which is a result of the reproduction, in this manner described above.

According to this embodiment, the video FIFO 28A for temporarily storing and outputting the video data is set so as to be have a capacity greater than the capacity corresponding to a preceding amount by which a first recording position of each pack unit precedes the recording position where the management information serving as the corresponding reproduction reference is recorded in the recording system.

A search-data detecting unit 29 receives search data from the separating circuit 27, generates video data from the search data, and outputs the generated video data. In the search-data detecting unit 29, a search decoder 29A receives the search data from the separating circuit 27, interpolates a part that was not able to be captured, and generates and outputs the video data, and a search auxiliary-data detector 29B acquires auxiliary data added to the search data and notifies the central processing unit (CPU) 8A of the auxiliary data.

An audio-data decompressing unit 30 receives the audio data from the separating circuit 27, and decompresses and outputs the audio data. In the audio-data decompressing unit 30, an audio FIFO 30A temporarily stores the audio data output from the separating circuit 27 and outputs the stored audio data, and an audio decoder 30B decompresses the audio data and outputs the decompressed audio data. With this structure, the video tape recorder 1 can output the audio data DA, which a result of the reproduction.

An auxiliary-data detecting unit 31 detects auxiliary data from the separating circuit 27 and outputs the detected auxiliary data to the controlling unit 8. In the auxiliary-data detecting unit 31, an auxiliary-data FIFO 31A temporarily stores the auxiliary data output from the separating circuit 27 and outputs the auxiliary data to the controlling unit 8, and an auxiliary-data generator FIFO 31B temporarily stores the auxiliary data output from the separating circuit 27, converts the auxiliary data into a format corresponding to outputs including the video data, the audio data, and the like, and outputs the converted auxiliary data to the central processing unit 8A.

In this manner, the controlling unit 8 controls these circuit blocks in the reproduction system, as in the recording system.

In other words, the central processing unit BA in the controlling unit 8 performs a procedure recorded in a memory (not shown) to control all the circuit blocks. In this processing, a system-time-clock STC generator 8B generates a system time clock STC, which is an operation reference of the video tape recorder 1, and outputs the system time clock STC. A reference ETN generator 8C generates an ETN that is a comparison reference from the system time clock STC and outputs the ETN. A tape-drum servo circuit 8D rotates and drives a capstan motor 8F and a drum motor 8E to drive the magnetic tape 2 at a predetermined speed, and rotates and drives the rotating drum wound around the magnetic tape 2 at a predetermined speed. In this processing, the tape-drum servo circuit BD compares the comparison reference ETN generated by the reference ETN generator 8C with the ETN determined by the reproduction result obtained from the data output from the demodulating unit 22 (ETN supplied from the sub-code detecting unit 26) to control the rotational phase of the capstan motor 8F such that the comparison reference ETN coincides with the ETN determined by the reproduction result. Accordingly, the video tape recorder 1 can scan the magnetic tape 2 with the magnetic head 14 by the same track trace as in the recording.

According to this embodiment, the processing circuit from the magnetic head 14 to the error-correcting-code ID detecting unit 24 serves as pack-unit reproduction means for processing a reproduction signal supplied from the magnetic tape 2 to reproduce the data in the pack unit. The demultiplexer 27B serves as data separating means for separating the video data from the data in the pack unit supplied from the pack-unit reproduction means. The video FIFO 28A serves as storing means for temporarily storing the video data output from the data separating means and outputting the stored video data. The video decoder 28B serves as data decompressing means for decompressing the data output from the storing means and outputting the decompressed data.

In the recording and reproduction systems represented as the blocks in the video tape recorder 1, the FIFOs 3D, 5B, 6B, and 6C in the recording system are structured so as to be used commonly with the FIFOs 28A, 30A, 31A, and 31B in the reproduction system. These FIFOs in the recording system are provided for achieving the timing shown in FIG. 32. Although not shown in figures, the reproduction system achieves a reverse timing, compared with the timing in FIG. 32, to realize the same relationship between the video data and the audio data output from the reproduction system as between the video data and the audio data input in the recording system.

(2) Operation of Embodiment

In the video tape recorder 1 having the structure described above (FIGS. 37 and 38), during the recording, the video data HDV and the audio data DA are compressed in the MPEG format in the video encoder 3A in the video-data compressing unit 3 and the audio encoder 5A in the audio-data compressing unit 5 to generate the video data and the audio data in the PES transport stream. The search generator 4 serving as the search-data generating unit 4 selects data corresponding to low-frequency components from the data in the I picture in the compressed video data to generate search data for 8× speed and 24× speed. The auxiliary data for generating the sub-code is generated by the auxiliary-data generating unit 6 by using the information concerning each picture in the video data, the auxiliary data input along with the video data, and so on.

In the generation of the auxiliary data in the video tape recorder 1, the DTS/PTS generator 3B generates the time management information DTS at a frequency of 90 [kHz], which serves as a reference when the video data HDV is output. The extended track number ETN is generated based on the time management information DTS according to an equation ETN=DTS/300.3 when the video data HDV has a field frequency of 59.94 [Hz] or according to an equation ETN=DTS/360 when the video data HDV has a field frequency of 50 [Hz]. The extended track number ETN is time information serving as a reproduction reference when the compressed video data recorded on the magnetic tape 2 is reproduced.

In the video tape recorder 1, the compressed video data and audio data, the auxiliary data, and the search data are subjected to multiplexing in the multiplexer 7B, are stored in the ECC memory 7D, and are output from the ECC memory 7D in a predetermined order, thereby allocating the data to the main sector as the main data and to the sub-code sector to be subjected to interleave. Subsequently, the ID and the error correcting codes C1 and C2 are added to the data output from the ECC memory 7D. After the added data is subjected to the 24-to-25 modulation in the 24-to-25 modulating unit 11, a sink is added to the modulated data in the sink adding unit 12. Accordingly, the video data, the audio data, part of the auxiliary data, and the search data are converted into the data stream (FIG. 4) in the main sector structure. In contrast, the auxiliary data is converted into the data stream (FIG. 21) in the sub-code sector structure similar to that in the main sector structure. After the data stream in the main sector structure and the data stream in the sub-code sector structure are subjected to the NRZI modulation in the converting unit 13, the modulated data is converted into the serial data stream and the converted data is recorded on the magnetic tape 2. At this time, in the video tape recorder 1, the postamble, the preamble, and so on are added to these data streams. The added data is sequentially and diagonally recorded on the magnetic tape 2 in the format shown in FIG. 2. In this processing, the ECC memory 7D is controlled such that the error correction process and the interleave process are performed for every 16 tracks on the magnetic tape 2, and the error correcting code is generated. Hence, in the video tape recorder 1, the DTS, the STP, the ETN, and so on are allocated to the sub-code, and the corresponding video data and audio data are recorded on the magnetic tape 2.

In the video tape recorder 1, the video data recorded on the magnetic tape 2 in the manner described above is compressed into a GOP including 15 pictures. Then, the video data forming one GOP including 15 pictures is divided in units of three pictures to generate pack data of the video data. In the video tape recorder 1, the pack data of the video data, the corresponding audio data, and the auxiliary data forms a pack unit. The video data, the audio data, and the auxiliary data are recorded on the magnetic tape 2 in units of the pack unit (FIG. 31). In each pack unit, the auxiliary data concerning the audio data, the audio data, and the auxiliary data concerning the video data are compiled at the side of the head to be sequentially recorded on the magnetic tape 2. Accordingly, the video data and so on recorded on the magnetic tape 2 in units of the pack unit can be processed in the video tape recorder 1.

In the video tape recorder 1, in addition to the recording in units of the pack unit, the ECCTB packet of the auxiliary data is allocated to the first sink block of the first track in each interleave unit in order to improve the performance of the processing, such as continuous recording. In addition, the search data for 8× speed and 24× speed is recorded at a predetermined position, thus achieving a high-speed search.

Each time the video data, the audio data, and the auxiliary data are recorded in units of sink blocks in the video tape recorder 1, the vbv delay in the decoding is determined for every pack unit in the controller 7. A position that precedes the vbv delay by a time period corresponding to a predetermined preceding amount that is greater than a time required for recording an average amount of data other than the video data in the pack unit on the magnetic tape is set to the recording position of the pack unit. Accordingly, the processing in the ECC memory 7D is controlled by the controller 7C such that the first recording position of the pack unit has a predetermined relationship with the recording position where the time information ETN serving as the reproduction reference is recorded and which corresponds to the head of the pack unit.

As described above, since the memories 3D and 28A are used in common in the recording system and the reproduction system in the video tape recorder 1, a margin is left in the space in these memories during reproduction, thus ensuring a high expandability.

In other words, when the head of each pack unit is not specified, it is necessary to provide a memory in the reproduction side to delay the pack unit. Accordingly, a large memory must be provided in the reproduction system. However, according to this embodiment, each pack unit can be recorded on the magnetic tape in anticipation of a margin in the reproduction and, therefore, the space of the buffer memory required for the reproduction side can be decreased. In a system in which the recording system shares the memory with the reproduction system, the buffer memory required in the recording system can be appropriated for the reproduction side. Actually, when the preceding amount corresponding to six tracks, which is a shift occurring in the recording of the auxiliary data or the like, is anticipated in the recording system, it is possible to accommodate a time shift more than the amount corresponding to 16 tracks described above in the format in the reproduction side.

From a reverse point of view, anticipating such a margin allows a large margin for recording a variety of data other than the video data and the audio data to be provided. For example, it is possible to record the auxiliary data of around 5 to 10 tracks (50 to 100 [KB]) for every two to five seconds. Furthermore, search data having a higher-definition can be recorded and search data having a search speed other than the search speed described above can be recorded. Anticipating a shift in the recording position in the reproduction side by 16 tracks decreases the video rate to 2 [Mbps] and increases the auxiliary data corresponding to the decrease in the video rate. Even when the video tape recorder 1 is applied to a system in which LPCM data of 2 [Mbps] is recorded, it is possible to accurately record and reproduce the video data.

Anticipating such a preceding amount allows the relationship with the sub-code and the relationship with the search data to be definitized. In other words, preceding the head of the pack unit in the manner described above allows detection of the corresponding sub-code, and the recording position of a desired main stream can be determined based on the sub-code. In addition, it is sufficient to provide a narrow range in which the main data is searched from the sub-code. Accordingly, it is possible to reproduce a desired main data in a short period of time. Furthermore, it is possible to easily determine a first packet even when, for example, packets are subjected to continuous recording.

Specifically, when the video data and the like recorded on the magnetic tape 2 is reproduced in the video tape recorder 1 in the manner described above (FIGS. 39 and 40), the reproduction signals supplied from the magnetic head 14 are sequentially processed, the sub-codes are detected by the sub-code detecting unit 26, and the controlling unit 8 is notified of the auxiliary data in the sub-codes. The reproduction position, the auxiliary data of the video data recorded on the magnetic tape, and the like are detected by the controlling unit 8. The video data, the audio data, and the like that are separated by the separating circuit 27 and are then decompressed are output.

For example, when a user instructs to perform a search process in the processing described above, the reference ETN generator 8C in the video tape recorder 1 generates the extended track number ETN, serving as a comparison reference, based on the system time clock STC generated in the system-time-clock STC generator 8B. The phase of the extended track number ETN serving as the comparison reference is compared with that of the extended track number ETN provided from the magnetic tape 2 to perform phase control for the capstan motor BF. The magnetic tape 2 is driven at a high speed to selectively scan the track having the search data recorded therein with the magnetic head 14, and the search data is separated from the data in the main sector provided as a result of the scanning by the separating circuit 27. The search data is processed by the search-data detecting unit 29 to output the video data for a search.

In contrast, in the ordinary reproduction, the extended track numbers ETN generated based on the system time clock STC are sequentially converted in accordance with the time management information DTS in the decoder in the ordinary reproduction. The video data and the audio data recorded on the magnetic tape 2 are sequentially decompressed and output. In this processing, in the video tape recorder 1, the extended track number ETN is set so as to be in proportion to the time management information DTS in the video data in the decoding and so as to be in proportion to the system time clock STC serving as an operation reference in the decoding. Hence, the operation of the servo system can be controlled based on the extended track number ETN to constitute the servo system and the stream processing system by using one reference, thus simplifying the entire structure of the video tape recorder 1.

Setting the extended track number ETN in this manner allows the extended track number ETN to be recorded in the header of the main data to determine whether the extended track number ETN is correctly recorded by comparing the sub-code and the stream header. Based on the comparison result, it is possible to effectively avoid, for example, reproducing incorrect data. In other words, confirming a time in the time management information DTS and the extended track number ETN having a predetermined relationship with this time management information DTS allows the recording position of the video data and the like on the magnetic tape to be physically validated. In addition, the recording position and the phase of the search data for 8× speed can easily be detected from the extended track number ETN of the sub-code and a picture type owing to the relationship with the ECCTB packet. In the video tape recorder 1, the corresponding search data precedes the maximum vbv delay represented by the extended track number ETN by 104 tracks.

(3) Advantages of Embodiments

With the structure described above, setting the recording position of the head of each pack unit to a position having a predetermined relationship with the recording position determined by the corresponding time management information allows the entire video tape recorder to be efficiently structured.

The head of each pack unit, which is the position having the predetermined relationship, precedes the recording position determined by the management information serving as a reproduction reference corresponding to the time management information in the decoder for decompressing and outputting the video data by an amount given by adding a predetermined preceding amount to the delay time in the decoding at the head of the pack unit, so that a desired recording position can easily be detected.

When the predetermined preceding amount has a value corresponding to, at least, an added time given by adding the time required for recording an average amount of data, other than the video data, in the pack unit on the magnetic tape and when a delay memory in the recording system is shared with the reproduction process, the preceding amount capable of being reproduced is increased and, therefore, the recorded data having a wider range (preceding 16 tracks in this embodiment) can be reproduced.

Specifically, it is possible to appropriate a required memory for the reproduction side by inserting the NULL data such that the maximum preceding amount in the recording is five tracks.

In other words, when the reproduction system shares a memory with the recording processing, a memory having a space more than the space corresponding to the preceding amount can be ensured, thus structuring the entire video tape recorder without practically increasing the required memory space.

Setting the trail of the pack unit so as to precede the recording position determined by the management information serving as the corresponding reproduction reference can maintain the relationship described above with the head of each pack unit in the recording of continuous pack units.

Generating the management information serving as a reproduction reference such that the management information serving as the reproduction reference varies in proportion to a clock serving as a processing reference when the video data is decompressed permits recording and reproduction of the video data with a simple structure and process, thus efficiently structuring the entire video tape recorder.

(4) Second Embodiment

According to a second embodiment, when the NULL data is allocated under the condition with respect to the head and trail of the pack unit according to the first embodiment described above, the NULL data is inserted toward the trail of the track such that the head of the subsequent pack unit reaches the head of the recording track. A video tape recorder according to the second embodiment is structured in the same manner as in the video tape recorder of the first embodiment except the NULL data that is additionally allocated.

Inserting the NULL data such that the head of the corresponding pack unit reaches the head of the recording track, as described above, can further simplify the entire structure.

The insertion of the NULL data allows the head of the pack unit to be detected in units of tracks to achieve a simple detection. In contrast, with the structure according to the first embodiment, it is necessary to detect the head of the pack unit in units of sink blocks. In the process of adding the tracks corresponding to the preceding amount (16 tracks) to the number of tracks corresponding to the vbv delay, it is sufficient to provide a simple 8-bit calculator capable of representing 104 tracks by using the number of preceding recorded tracks 10 in units of tracks, whereas it is necessary to perform a calculation process until a value of 140 corresponding to the number of sink blocks is given in units of sink blocks and, thus, requiring a 16-bit calculator having additional eight bits. Accordingly, a simpler structure can be realized in the second embodiment.

If the NULL data is detected in the middle of a track when the NULL data is recorded in the manner described above, the subsequent search can be finished for this track, thus simplifying a variety of processing. In addition, it is also possible to improve error resilience by utilizing the NULL data allocated in the manner described above in the error correction.

(5) Other Embodiments

Although a case in which the data in the main stream is delayed by recording the NULL data is described in the above embodiments, the present invention is not limited to this case and can be widely applied to various delaying methods. For example, the present invention can be applied to a case in which the data in the main stream is delayed by repeatedly recording the same main data.

Although a case in which the video data compressed in the MPEG format is recorded is described in the above embodiments, the present invention is not limited to this case. The present invention can be widely applied to cases in which the video data compressed in various formats is recorded.

As described above, according to the present invention, setting the recording position of the head of each pack unit so as to have a predetermined relationship with the recording position determined by the corresponding time management information allows the entire video tape recorder to be efficiently structured.

INDUSTRIAL APPLICABILITY

The present invention relates to a video tape recorder and a method of recording data on a magnetic tape. Particularly, the present invention can be applied to a video tape recorder that records a video signal of the HDTV on a magnetic tape.

The invention claimed is:

1. A video tape recorder for sequentially and diagonally forming recording tracks on a magnetic tape and recording compressed video data, compressed audio data, and data relating to the video data and the audio data on the magnetic tape, the video tape recorder is characterized by comprising:
   pack-unit generating means for blocking the video data in units of a predetermined number of blocks to generate a pack unit including a combination of the video data in the block, the corresponding audio data, and the related data;
   management-information generating means for generating management information serving as a reproduction reference when the video data is reproduced from the magnetic tape, from time management information when the video data is decompressed and output;
   delay means for delaying data output from the pack-unit generating means;
   a recording system for recording the data output from the pack-unit generating means on the magnetic tape along with the management information serving as the reproduction reference; and
   controlling means for varying a delay time generated in the delay means,
   wherein the controlling means varies the delay time generated in the delay means such that the recording position of the head of each pack unit is set to a position having a predetermined relationship with the recording position determined by the management information serving as the corresponding reproduction reference and wherein the head of each pack unit, which is the position having the predetermined relationship, precedes the recording position determined by the management information serving as the reproduction reference corresponding to the time management information by an amount given by adding a predetermined preceding amount to the delay time in the decoding at the head of the pack unit.

2. The video tape recorder according to claim 1, characterized in that the predetermined preceding amount has, at least, a value corresponding to an average amount of data, other than the video data, in the pack unit.

3. The video tape recorder according to claim 1, characterized in that the recording system inserts NULL data of, at least, an amount corresponding to the delay time generated in the delay means into the data output from the pack-unit generating means.

4. The video tape recorder according to claim 3, characterized in that the controlling means sets the head of the corresponding pack unit to the head of the recording track by inserting the NULL data.

5. The video tape recorder according to claim 1, characterized in that the controlling means sets the trail of the pack unit to a position preceding the recording position determined by the management information serving as the corresponding reproduction reference.

6. The video tape recorder according to claim 1, characterized by further comprising:
   pack-unit reproduction means for processing a reproduction signal supplied from the magnetic tape to reproduce the data in the pack unit;
   data separating means for separating the video data from the data in the pack unit reproduced by the pack-unit reproduction means;
   storing means for temporarily storing the video data output from the data separating means and outputting the stored video data; and
   data decompressing means for decompressing the data output from the storing means and outputting the decompressed data,
   wherein the storing means has a capacity more than the amount corresponding to the preceding amount.

7. A video tape recorder for sequentially and diagonally forming recording tracks on a magnetic tape and recording compressed video data, compressed audio data, and data relating to the video data and the audio data on the magnetic tape, the video tape recorder is characterized by comprising:
   pack-unit generating means for blocking the video data in units of a predetermined number of blocks to generate a pack unit including a combination of the video data in the block, the corresponding audio data, and the related data;
   management-information generating means for generating management information serving as a reproduction reference when the video data is reproduced from the magnetic tape, from time management information when the video data is decompressed and output; and
   a recording system for recording the data in the pack unit on the magnetic tape along with the management information serving as the reproduction reference,
   wherein the management-information generating means generates the management information serving as the reproduction reference such that the management information serving as the reproduction reference is varied in proportion to a clock serving as a processing reference when the video data is decompressed and wherein the recording position of each pack unit precedes the reproduction reference generated by the time management information by an amount given by adding a predetermined preceding amount to the processing reference.

8. A recording method of sequentially and diagonally forming recording tracks on a magnetic tape and recording compressed video data, compressed audio data, and data relating to the video data and the audio data on the magnetic tape, the recording method is characterized by comprising:

- a pack-unit generating step of blocking the video data in units of a predetermined number of blocks to generate a pack unit including a combination of the video data in the block, the corresponding audio data, and the related data;
- a management-information generating step of generating management information serving as a reproduction reference when the video data is reproduced from the magnetic tape, from time management information when the video data is decompressed and output;
- a delay step of delaying the pack-unit;
- a recording step of recording the pack unit on the magnetic tape along with the management information serving as the a reproduction reference; and
- a controlling step of varying a delay time generated in the delay step,
- wherein the controlling step varies the delay time such that the recording position of the head of each pack unit is set to a position having a predetermined relationship with the recording position determined by the management information serving as the corresponding reproduction reference and wherein the head of each pack unit, which is the position having the predetermined relationship, precedes the recording position determined by the management information serving as the reproduction reference corresponding to the time management information by an amount given by adding a predetermined preceding amount to the delay time in the decoding at the head of the pack unit.

9. A recording method of sequentially and diagonally forming recording tracks on a magnetic tape and recording compressed video data, compressed audio data, and data relating to the video data and the audio data on the magnetic tape, the recording method is characterized by comprising:

- a pack-unit generating step of blocking the video data in units of a predetermined number of blocks to generate a pack unit including a combination of the video data in the block, the corresponding audio data, and the related data;
- a management-information generating step of generating management information serving as a reproduction reference when the video data is reproduced from the magnetic tape, from time management information when the video data is decompressed and output; and
- a recording step of recording the data in the pack unit on the magnetic tape along with the management information serving as the reproduction reference,
- wherein the management-information generating step generates the management information serving as the reproduction reference such that the management information serving as the reproduction reference is varied in proportion to a clock serving as a processing reference when the video data is decompressed and wherein the recording position of each pack unit precedes the reproduction reference generated by the time management information by an amount given by adding a predetermined preceding amount to the processing reference.

* * * * *